US012633841B2

(12) United States Patent
Xu et al.

(10) Patent No.: US 12,633,841 B2
(45) Date of Patent: May 19, 2026

(54) THREE-LEVEL INVERTER, CONTROL METHOD, AND SYSTEM

(71) Applicant: Huawei Digital Power Technologies Co., Ltd., Shenzhen (CN)

(72) Inventors: Fei Xu, Shanghai (CN); Xinyu Yu, Shanghai (CN); Kai Xin, Shanghai (CN); Xiaoxiang Zhou, Shanghai (CN); Lei Shi, Shanghai (CN); Peng Ju, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 18/180,258

(22) Filed: Mar. 8, 2023

(65) Prior Publication Data

US 2023/0216426 A1 Jul. 6, 2023

Related U.S. Application Data

(63) Continuation of application No. PCT/CN2020/114127, filed on Sep. 9, 2020.

(51) Int. Cl.
*H02M 7/483* (2007.01)
*H02M 1/12* (2006.01)
*H02M 1/36* (2007.01)

(52) U.S. Cl.
CPC ........... *H02M 7/483* (2013.01); *H02M 1/126* (2013.01); *H02M 1/36* (2013.01)

(58) Field of Classification Search
CPC ......... H02M 7/483; H02M 1/126; H02M 1/36
See application file for complete search history.

(56) References Cited

U.S. PATENT DOCUMENTS

| | | | | |
|---|---|---|---|---|
| 5,633,791 A | * | 5/1997 | Poon ................. | H02M 7/53871 363/56.02 |
| 11,581,820 B1 | * | 2/2023 | Mekonnen ........ | H02M 7/53871 |
| 2005/0139259 A1 | * | 6/2005 | Steigerwald .............. | H02J 7/35 136/244 |
| 2013/0088901 A1 | * | 4/2013 | Bleus .................... | H02M 7/537 363/71 |
| 2013/0235626 A1 | * | 9/2013 | Jang .................... | H02M 5/4585 363/37 |

(Continued)

FOREIGN PATENT DOCUMENTS

| | | |
|---|---|---|
| CN | 109327154 A | 2/2019 |
| CN | 106877720 B | 3/2019 |

*Primary Examiner* — Gary L Laxton
(74) *Attorney, Agent, or Firm* — Maier & Maier, PLLC

(57) ABSTRACT

A three-level inverter includes controllable switch components T1 to T6. Each of the controllable switch components includes a parallel connected junction capacitor and an anti-parallel connected diode. A first terminal of T1 is connected to a positive direct current bus, a second terminal of T4 is connected to a negative direct current bus, a second terminal of T1 is connected to first terminals of T2 and T5. A controller is configured to: in a positive half cycle, control T3 to be conducted after T1 is conducted, and control T3 to be disconnected before T1 is conducted next time; and in a negative half cycle, control T2 to be conducted after T4 is conducted, and control T2 to be disconnected before T4 is conducted next time. The three-level inverter can balance voltages of the controllable switch components.

20 Claims, 13 Drawing Sheets

(56) References Cited

U.S. PATENT DOCUMENTS

| | | | |
|---|---|---|---|
| 2015/0131352 A1* | 5/2015 | Hart ..................... | H02M 7/537 |
| | | | 363/131 |
| 2015/0214856 A1* | 7/2015 | Nakashima ........... | H02M 7/537 |
| | | | 363/131 |

* cited by examiner

THREE-LEVEL INVERTER, CONTROL METHOD, AND SYSTEM

CROSS-REFERENCE TO RELATED APPLICATION

This application a continuation of International Patent Application No. PCT/CN2020/114127, filed on Sep. 9, 2020, the disclosure of which is hereby incorporated by reference in its entirety.

TECHNICAL FIELD

The embodiments relate to the field of power electronics technologies, a three-level inverter, a control method, and a system.

BACKGROUND

Photovoltaic power generation is a technology that uses photovoltaic effect of a semiconductor interface to convert light energy into electric energy and has always been developed rapidly.

As a core component in a photovoltaic power generation system, a photovoltaic inverter is configured to convert a direct current generated by a photovoltaic module into an alternating current. As a type of the photovoltaic inverter, a three-level inverter is widely used because the three-level inverter can effectively reduce a volume of a passive device such as a filter inductor.

Theoretically, a voltage stress of each controllable switch component of the three-level inverter is half of a direct current bus voltage. However, due to impact of discreteness of a parasitic parameter such as junction capacitance of the controllable switch components, voltage stress imbalance of the controllable switch components may be caused during circuit commutation of the three-level inverter. As a result, the voltage stress of the controllable switch component of the three-level inverter may exceed or may be less than a half of the direct current bus voltage. Consequently, a part of the controllable switch components may have a risk of voltage overstress.

SUMMARY

An embodiments may provide a three-level inverter, a control method, and a system, so as to enable controllable switch components of the three-level inverter to implement voltage balance.

According to a first aspect, a three-level inverter may include six controllable switch components T1 to T6. Each of the controllable switch components includes a parallel connected junction capacitor and an anti-parallel connected diode. A first terminal of T1 is connected to a positive direct current bus, a second terminal of T4 is connected to a negative direct current bus, a second terminal of T1 is connected to first terminals of T2 and T5, a first terminal of T4 is connected to second terminals of T3 and T6, a second terminal of T2 and a first terminal of T3 are connected to a direct current bus midpoint, and a second terminal of T5 and a first terminal of T6 are connected together to form a bridge arm terminal. A controller is further included, where the controller controls working states of the controllable switch components by sending control signals. The controller is configured to: in a positive half cycle, control T3 to be conducted after T1 is conducted, and control T3 to be disconnected before T1 is conducted next time; and in a negative half cycle, control T2 to be conducted after T4 is conducted, and control T2 to be disconnected before T4 is conducted next time.

The controller controls, in the positive half cycle, T3 to start to be conducted after T1 is conducted, and T3 is conducted once after T1 is conducted next time. The voltage at the two terminals of T4 is clamped to a half of the direct current bus voltage. Because T1 and T5 are conducted in this case, the voltage at the two terminals of T6 is also clamped to a half of the direct current bus voltage. Because T3 is disconnected before T1 is conducted next time, the current of the loop in which the diode of T6 and T3 are located is blocked by disconnecting T3 in advance. Therefore, a problem of a voltage spike caused by reverse recovery of the diode of T6 is avoided when dynamic voltage balance between T4 and T6 is implemented.

In addition, in the negative half cycle, the controller controls T2 to be conducted after T4 is conducted, and controls T2 to be conducted once after T4 is conducted next time, to avoid a problem of overstress to the voltage at the two terminals of T5 due to reverse recovery of the diode of T5, and the voltage at the two terminals of T1 is clamped to a half of the direct current bus voltage. In this case, T4 and T6 are conducted, so that the voltage at the two terminals of T5 is also clamped to a half of the direct current bus voltage. Because T2 is disconnected before T4 is conducted next time, the current of the loop in which the diode of T5 and T2 are located is blocked by disconnecting T2 in advance. Therefore, a problem of a voltage spike caused by reverse recovery of the diode of T5 is avoided when dynamic voltage balance between T1 and T5 is implemented.

In addition, in a period in which a bridge arm voltage is at a zero level, because T3 and T2 have a common conduction time, dual-channel freewheeling is performed in the zero-level period. Therefore, a conduction loss in the zero-level period is further reduced, and efficiency of the three-level inverter is improved.

With reference to the first aspect, in a first possible implementation, the controller is further configured to: in the positive half cycle, adjust a duty cycle and/or a phase of a control signal of T2, and control T3 by using an adjusted control signal; and in the negative half cycle, adjust a duty cycle and/or a phase of a control signal of T3, and control T2 by using the adjusted control signal.

In this implementation, in the positive half cycle, the control signal of T3 is obtained by adjusting the control signal of T2; and in the negative half cycle, the control signal of T2 is obtained by adjusting the control signal of T3.

With reference to the first aspect, in a second possible implementation, in the positive half cycle, a duty cycle of a control signal of T3 increases or decreases relative to a duty cycle of a control signal of T2; and in the negative half cycle, the duty cycle of the control signal of T2 increases or decreases relative to the duty cycle of the control signal of T3. In this implementation, the control signals of the switch tubes are independently set control signals.

With reference to the first aspect, in a third possible implementation, in the positive half cycle, the control signal of T3 is phase-shifted relative to the control signal of T2; and in the negative half cycle, the control signal of T2 is phase-shifted relative to the control signal of T3.

With reference to the first aspect, in a fourth possible implementation, the controller may be configured to: in the positive half cycle, enable a rising edge of the control signal of T3 to delay relative to a rising edge of the control signal of T2 by a first preset time, and enable a falling edge of the control signal of T3 to advance relative to a falling edge of the control signal of T2 by a second preset time; and in the negative half cycle, enable the rising edge of the control signal of T2 to delay relative to the rising edge of the control signal of T3 by the first preset time, and enable the falling edge of the control signal of T2 to advance relative to the falling edge of the control signal of T3 by the second preset time.

In this case, in the positive half cycle, the duty cycle of the control signal of T3 is reduced relative to the duty cycle of the control signal of T2; and in the negative half cycle, the duty cycle of the control signal of T2 is reduced relative to the duty cycle of the control signal of T3.

With reference to the first aspect, in a fifth possible implementation, the controller may be configured to:

in the positive half cycle, enable a rising edge of the control signal of T3 to delay relative to a rising edge of the control signal of T2 by a third preset time; and enable a falling edge of the control signal of T3 to delay relative to a falling edge of the control signal of T2 by a fourth preset time, and advance relative to a next rising edge of a control signal of T1 by a fifth preset time, where the fifth preset time is used to ensure that T3 is already disconnected when T1 is conducted next time; and in the negative half cycle, enable the rising edge of the control signal of T2 to delay relative to the rising edge of the control signal of T3 by the third preset time; and enable the falling edge of the control signal of T2 to delay relative to the falling edge of the control signal of T3 by the fourth preset time, and advance relative to a next rising edge of T4 by the fifth preset time, where the fifth preset time is used to ensure that T2 is already disconnected when T4 is conducted next time.

In this implementation, when the third preset time is equal to the fourth preset time, the control signal of T3 in the positive half cycle may be obtained by performing phase shifting on the control signal of T2, and the control signal of T2 in the negative half cycle may be obtained by performing phase shifting on the control signal of T3.

With reference to the first aspect, in a sixth possible implementation, the controller may be configured to:

in the positive half cycle, enable a rising edge of the control signal of T3 to delay relative to a rising edge of the control signal of T1 by a sixth preset time, and advance relative to a rising edge of the control signal of T2 by a seventh preset time, where the sixth preset time is used to ensure that T1 is already conducted when T3 is conducted; and enable a falling edge of the control signal of T3 to delay relative to a falling edge of the control signal of T2 by an eighth preset time, and advance relative to a next rising edge of the control signal of T1 by a ninth preset time, where the ninth preset time is used to ensure that T3 is already disconnected when T1 is conducted next time; and in the negative half cycle, enable the rising edge of the control signal of T2 to delay relative to a rising edge of a control signal of T4 by the sixth preset time, and advance relative to the rising edge of the control signal of T3 by the seventh preset time, where the sixth preset time is used to ensure that T4 is already conducted when T2 is conducted; and enable the falling edge of the control signal of T2 to delay relative to the falling edge of the control signal of T3 by the eighth preset time, and advance relative to a next rising edge of the control signal of T4 by the ninth preset time, where the ninth preset time is used to ensure that T2 is already disconnected when T4 is conducted next time.

In this implementation, in the positive half cycle, duration of the control signal of T3 covers duration of the control signal of T2, and in the negative half cycle, duration of the control signal of T2 covers duration of the control signal of T3. Therefore, in a period in which a bridge arm voltage is at a zero level, T2 and T3 have a long common conduction time, and dual-channel freewheeling is performed in the zero-level period, so that a conduction loss in the zero-level period is reduced, and efficiency of the three-level inverter is improved.

With reference to the first aspect, in a seventh possible implementation, the controller may be configured to:

in the positive half cycle, enable a rising edge of the control signal of T3 to delay relative to a rising edge of a control signal of T1 by a tenth preset time, and advance relative to a falling edge of the control signal of T1 by an eleventh preset time, where the tenth preset time is used to ensure that T1 is already conducted when T3 is conducted; and enable a falling edge of the control signal of T3 to advance relative to a falling edge of the control signal of T2 by a twelfth preset time; and in the negative half cycle, enable a rising edge of the control signal of T2 to delay relative to a rising edge of a control signal of T4 by the tenth preset time, and advance relative to a falling edge of the control signal of T4 by the eleventh preset time, where the tenth preset time is used to ensure that T4 is already conducted when T2 is conducted; and enable the falling edge of the control signal of T2 to advance relative to the falling edge of the control signal of T3 by the twelfth preset time.

With reference to the first aspect, in an eighth possible implementation, the controller may be configured to:

in the positive half cycle, enable a rising edge of the control signal of T3 to delay relative to a rising edge of a control signal of T1 by a thirteenth preset time, and advance relative to a falling edge of the control signal of T1 by a fourteenth preset time, where the thirteenth preset time is used to ensure that T1 is already conducted when T3 is conducted; and enable a falling edge of the control signal of T3 to delay relative to a falling edge of the control signal of T2 by a fifteenth preset time, and advance relative to a next rising edge of the control signal of T1 by a sixteenth preset time, where the sixteenth preset time is used to ensure that T3 is already disconnected when T1 is conducted next time; and in the negative half cycle, enable a rising edge of the control signal of T2 to delay relative to a rising edge of a control signal of T4 by the thirteenth preset time, and advance relative to a falling edge of the control signal of T4 by the fourteenth preset time, where the thirteenth preset time is used to ensure that T4 is already conducted when T2 is conducted; and enable the falling edge of the control signal of T2 to delay relative to the falling edge of the control signal of T3 by the fifteenth preset time, and advance relative to a next rising edge of the control signal of T4 by the sixteenth preset time, where the sixteenth preset time is used to ensure that T2 is already disconnected when T4 is conducted next time.

In this implementation, in the positive half cycle, duration of the control signal of T3 covers duration of the control signal of T2, and in the negative half cycle, duration of the control signal of T2 covers duration of the control signal of T3. Therefore, in a period in which a bridge arm voltage is at a zero level, T2 and T3 have a long common conduction time, and dual-channel freewheeling is performed in the zero-level period, so that a conduction loss in the zero-level period is reduced, and efficiency of the three-level inverter is improved.

According to a second aspect, the embodiments may provide a method for controlling a three-level inverter. The applied three-level inverter includes six controllable switch components T1 to T6. Each of the controllable switch components includes a parallel connected junction capacitor and an anti-parallel connected diode. A first terminal of T1 is connected to a positive direct current bus, a second terminal of T4 is connected to a negative direct current bus, a second terminal of T1 is connected to first terminals of T2 and T5, a first terminal of T4 is connected to second terminals of T3 and T6, a second terminal of T2 and a first terminal of T3 are connected to a direct current bus mid-point, and a second terminal of T5 and a first terminal of T6 are connected together to form a bridge arm terminal. The method includes:

in a positive half cycle, controlling T3 to be conducted after T1 is conducted, and controlling T3 to be disconnected before T1 is conducted next time; and in a negative half cycle, controlling T2 to be conducted after T4 is conducted, and controlling T2 to be disconnected before T4 is conducted next time.

According to the control method, in the positive half cycle, T3 is controlled to start to be conducted after T1 is conducted, and T3 is conducted once after T1 is conducted next time. The voltage at the two terminals of T4 is clamped to a half of the direct current bus voltage. Because T1 and T5 are conducted in this case, the voltage at the two terminals of T6 is also clamped to a half of the direct current bus voltage. Because T3 is disconnected before T1 is conducted next time, the current of the loop in which the diode of T6 and T3 are located is blocked by disconnecting T3 in advance. Therefore, a problem of a voltage spike caused by reverse recovery of the diode of T6 is avoided when dynamic voltage balance between T4 and T6 is implemented.

In addition, in the negative half cycle, T2 is controlled to be conducted after T4 is conducted, and T2 is controlled to be conducted once after T4 is conducted next time, to avoid a problem of overstress to the voltage at the two terminals of T5 due to reverse recovery of the diode of T5, and the voltage at the two terminals of T1 is clamped to a half of the direct current bus voltage. In this case, T4 and T6 are conducted, so that the voltage at the two terminals of T5 is also clamped to a half of the direct current bus voltage. Because T2 is disconnected before T4 is conducted next time, the current of the loop in which the diode of T5 and T2 are located is blocked by disconnecting T2 in advance. Therefore, a problem of a voltage spike caused by reverse recovery of the diode of T5 is avoided when dynamic voltage balance between T1 and T5 is implemented.

In addition, in a period in which a bridge arm voltage is at a zero level, because T3 and T2 have a common conduction time, dual-channel freewheeling is performed in the zero-level period. Therefore, a conduction loss in the zero-level period is further reduced, and efficiency of the three-level inverter is improved.

With reference to the second aspect, in a first possible implementation, the method further includes:

in the positive half cycle, adjusting a duty cycle and/or a phase of a control signal of T2, and controlling T3 by using the adjusted control signal; and in the negative half cycle, adjusting a duty cycle and/or a phase of a control signal of T3, and controlling T2 by using the adjusted control signal.

With reference to the second aspect, in a second possible implementation, in the positive half cycle, a duty cycle of a control signal of T3 increases or decreases relative to a duty cycle of a control signal of T2; and in the negative half cycle, the duty cycle of the control signal of T2 increases or decreases relative to the duty cycle of the control signal of T3.

With reference to the second aspect, in a third possible implementation, in the positive half cycle, the control signal of T3 is phase-shifted relative to the control signal of T2; and in the negative half cycle, the control signal of T2 is phase-shifted relative to the control signal of T3.

With reference to the second aspect, in a fourth possible implementation, the controlling T3 to be conducted after T1 is conducted, and controlling T3 to be disconnected before T1 is conducted next time, in a positive half cycle, may include:

enabling a rising edge of the control signal of T3 to delay relative to a rising edge of the control signal of T2 by a first preset time, and enabling a falling edge of the control signal of T3 to advance relative to a falling edge of the control signal of T2 by a second preset time; and the controlling T2 to be conducted after T4 is conducted, and controlling T2 to be disconnected before T4 is conducted next time, in a negative half cycle, may include:

enabling the rising edge of the control signal of T2 to delay relative to the rising edge of the control signal of T3 by the first preset time, and enabling the falling edge of the control signal of T2 to advance relative to the falling edge of the control signal of T3 by the second preset time.

With reference to the second aspect, in a fifth possible implementation, the controlling T3 to be conducted after T1 is conducted, and controlling T3 to be disconnected before T1 is conducted next time, in a positive half cycle, may include:

enabling a rising edge of the control signal of T3 to delay relative to a rising edge of the control signal of T2 by a third preset time; and enabling a falling edge of the control signal of T3 to delay relative to a falling edge of the control signal of T2 by a fourth preset time, and advance relative to a next rising edge of a control signal of T1 by a fifth preset time, where the fifth preset time is used to ensure that T3 is already disconnected when T1 is conducted next time; and the controlling T2 to be conducted after T4 is conducted, and controlling T2 to be disconnected before T4 is conducted next time, in a negative half cycle, may include:

enabling the rising edge of the control signal of T2 to delay relative to the rising edge of the control signal of T3 by the third preset time; and enabling the falling edge of the control signal of T2 to delay relative to the falling edge of the control signal of T3 by the fourth preset time, and advance relative to a next rising edge of a control signal of T4 by the fifth preset time, where the fifth preset time is used to ensure that T2 is already disconnected when T4 is conducted next time.

With reference to the second aspect, in a sixth possible implementation, the controlling T3 to be conducted after T1 is conducted, and controlling T3 to be disconnected before T1 is conducted next time, in a positive half cycle, may include:

enabling a rising edge of the control signal of T3 to delay relative to a rising edge of the control signal of T1 by a sixth preset time, and advance relative to a rising edge of the control signal of T2 by a seventh preset time, where the sixth preset time is used to ensure that T1 is already conducted when T3 is conducted; and enabling a falling edge of the control signal of T3 to delay relative to a falling edge of the control signal of T2 by an eighth preset time, and advance relative to a next rising edge of the control signal of T1 by a ninth preset time, where the ninth preset time is used to ensure that T3 is already disconnected when T1 is conducted next time; and the controlling T2 to be conducted after T4 is conducted, and controlling T2 to be disconnected before T4 is conducted next time, in a negative half cycle, may include:

enabling the rising edge of the control signal of T2 to delay relative to a rising edge of a control signal of T4 by the sixth preset time, and advance relative to the rising edge of the control signal of T3 by the seventh preset time, where the sixth preset time is used to ensure that T4 is already conducted when T2 is conducted; and enabling the falling edge of the control signal of T2 to delay relative to the falling edge of the control signal of T3 by the eighth preset time, and advance relative to a next rising edge of the control signal of T4 by the ninth preset time, where the ninth preset time is used to ensure that T2 is already disconnected when T4 is conducted next time.

With reference to the second aspect, in a seventh possible implementation, the controlling T3 to be conducted after T1 is conducted, and controlling T3 to be disconnected before T1 is conducted next time, in a positive half cycle, may include:

enabling a rising edge of the control signal of T3 to delay relative to a rising edge of a control signal of T1 by a tenth preset time, and advance relative to a falling edge of the control signal of T1 by an eleventh preset time, where the tenth preset time is used to ensure that T1 is already conducted when T3 is conducted; and enabling a falling edge of the control signal of T3 to advance relative to a falling edge of the control signal of T2 by a twelfth preset time; and the controlling T2 to be conducted after T4 is conducted, and controlling T2 to be disconnected before T4 is conducted next time, in a negative half cycle, may include:

enabling a rising edge of the control signal of T2 to delay relative to a rising edge of a control signal of T4 by the tenth preset time, and advance relative to a falling edge of the control signal of T4 by the eleventh preset time, where the tenth preset time is used to ensure that T4 is already conducted when T2 is conducted; and enabling the falling edge of the control signal of T2 to advance relative to the falling edge of the control signal of T3 by the twelfth preset time.

With reference to the second aspect, in an eighth possible implementation, the controlling T3 to be conducted after T1 is conducted, and controlling T3 to be disconnected before T1 is conducted next time, in a positive half cycle, may include:

enabling a rising edge of the control signal of T3 to delay relative to a rising edge of a control signal of T1 by a thirteenth preset time, and advance relative to a falling edge of the control signal of T1 by a fourteenth preset time, where the thirteenth preset time is used to ensure that T1 is already conducted when T3 is conducted; and enabling a falling edge of the control signal of T3 to delay relative to a falling edge of the control signal of T2 by a fifteenth preset time, and advance relative to a next rising edge of the control signal of T1 by a sixteenth preset time, where the sixteenth preset time is used to ensure that T3 is already disconnected when T1 is conducted next time; and the controlling T2 to be conducted after T4 is conducted, and controlling T2 to be disconnected before T4 is conducted next time, in a negative half cycle, may include:

enabling a rising edge of the control signal of T2 to delay relative to a rising edge of a control signal of T4 by the thirteenth preset time, and advance relative to a falling edge of the control signal of T4 by the fourteenth preset time, where the thirteenth preset time is used to ensure that T4 is already conducted when T2 is conducted; and enabling the falling edge of the control signal of T2 to delay relative to the falling edge of the control signal of T3 by the fifteenth preset time, and advance relative to a next rising edge of the control signal of T4 by the sixteenth preset time, where the sixteenth preset time is used to ensure that T2 is already disconnected when T4 is conducted next time.

In this implementation, in the positive half cycle, duration of the control signal of T3 covers duration of the control signal of T2, and in the negative half cycle, duration of the control signal of T2 covers duration of the control signal of T3. Therefore, in a period in which a bridge arm voltage is at a zero level, T2 and T3 have a long common conduction time, and dual-channel freewheeling is performed in the zero-level period, so that a conduction loss in the zero-level period is reduced, and efficiency of the three-level inverter is improved.

According to a third aspect, the embodiments may further provide a photovoltaic power generation system. The system includes the three-level inverter provided in any of the foregoing implementations, and further includes a photovoltaic unit. The photovoltaic unit includes a plurality of photovoltaic modules, and an output terminal of the photovoltaic unit is connected to an input terminal of the three-level inverter. The photovoltaic unit is configured to: convert light energy into a direct current and transmit the direct current to the three-level inverter.

The controllable switch components of the three-level inverter in the photovoltaic power generation system can implement voltage balance, and therefore higher efficiency is achieved, to further improve efficiency of the photovoltaic power generation system.

DETAILED DESCRIPTION OF THE EMBODIMENTS

To make a person skilled in the art better understand the embodiments, an application scenario is first described below.

Figure 1:
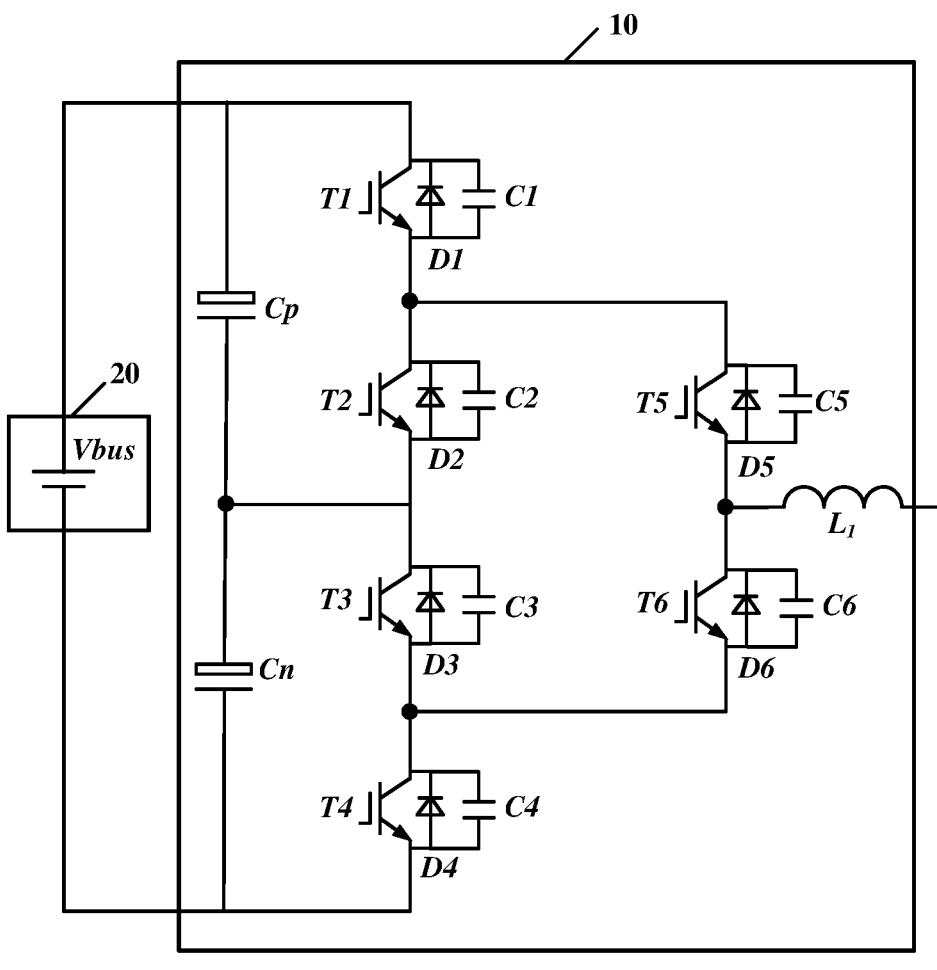
FIG. 1 is a schematic diagram of a three-level inverter.

FIG. 1 is a schematic diagram of a three-level inverter.

As shown in the figure, the three-level inverter 10 includes bus capacitors Cp and Cn. A first terminal of Cp is connected to a positive direct current bus, a second terminal of Cp is connected to a negative direct current bus by using Cn, and the second terminal of Cp is a direct current bus midpoint. A positive input terminal of the three-level inverter 10 is connected to the positive direct current bus, and a negative input terminal of the three-level inverter 10 is connected to the negative direct current bus.

A power supply 20 is configured to provide a direct current to maintain a bus voltage. For a photovoltaic power generation system, the power supply 20 is a photovoltaic unit. The photovoltaic unit includes a plurality of photovoltaic modules. For example, the plurality of photovoltaic modules may be first connected in series to form a photovoltaic string, and then a plurality of photovoltaic strings may be connected in parallel to form the photovoltaic unit.

The three-level inverter 10 includes controllable switch components T1 to T6. Each controllable switch component is anti-parallel connected to a diode, and each controllable switch component is further parallel connected to a capacitor. The diode is a body diode (also referred to as a parasitic diode) of the switch component, and the capacitor is a parasitic capacitor of the switch component.

Theoretically, a voltage stress of each controllable switch component of the three-level inverter is half of a direct current bus voltage. However, due to impact of a parasitic capacitor, a voltage stress imbalance problem exists in the controllable switch component during circuit commutation.

Figure 2:
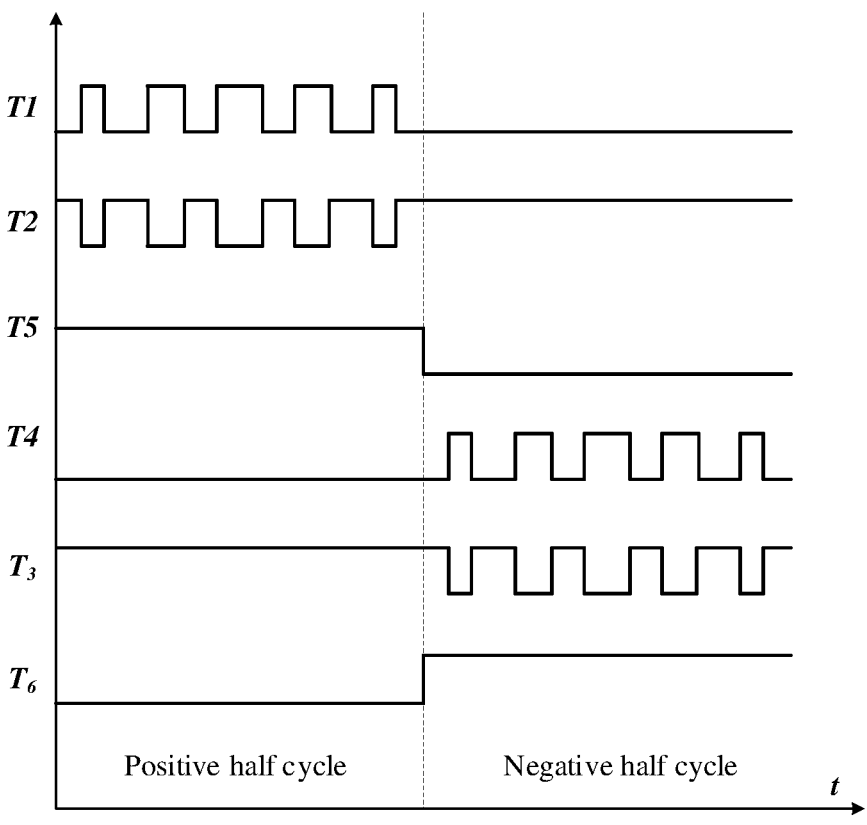
FIG. 2 is an existing control sequence diagram 1.

FIG. 2 is an existing control sequence diagram 1.

Waveforms shown in sequence diagrams in FIG. 2 and the following embodiments correspond to control signals of controllable switch components. The following uses an example in which a controllable switch component is conducted when a control signal is at a high level and the controllable switch component is disconnected when the control signal is at a low level for description.

When a control manner shown in FIG. 2 is used, Vdc is used to represent a direct current bus voltage. In a positive half cycle, T4 and T6 are disconnected, T3 and T5 are conducted, and T1 and T2 are complementarily conducted at a high frequency. In the positive half cycle, a voltage stress of T4 is forcibly clamped at ½ Vdc by conducting T3. Therefore, during high-frequency complementary conduction of T1 and T2, a voltage stress of T6 is also clamped at ½ Vdc. In a negative half cycle, T1 and T5 are disconnected, T2 and T6 are conducted, and T3 and T4 are complementarily conducted at a high frequency. A voltage stress of T1 is forcibly clamped at ½ Vdc by conducting T2. Therefore, during high-frequency complementary conduction of T3 and T4, a voltage stress of T5 is also clamped at ½ Vdc.

However, it has been found in research that, in the positive half cycle, when T3 is conducted and a bridge arm is in a zero-level period, a current passes through a loop in which T3 and D6 are located, and when T1 is conducted again, a diode D6 bears an inversed voltage and is disconnected. When the diode D6 changes from a conducting state to a cut-off state, stored charges need to be first released before the diode blocks a reverse current. This discharge time is referred to as a reverse recovery time. During the reverse recovery time, the current flows through the diode D6 in a reverse direction. During the reverse recovery time of D6, a high-voltage spike is formed at two terminals of T6, causing a risk of overstress to T6. In the negative half cycle, similarly, T5 has a risk of overstress.

The embodiments may provide a three-level inverter, a control method, and a system, so as to avoid damage to a controllable switch component of the three-level inverter due to voltage imbalance, and also help reduce a voltage spike caused by reverse recovery of a diode.

To make a person skilled in the art understand the embodiments better, the following describes the embodiments with reference to the accompanying drawings.

The terms such as "first" and "second" are used only for the purpose of description and cannot be understood as indicating or implying relative importance or implicitly indicating a quantity.

Unless otherwise clearly specified and limited, a term "connection" should be understood in a broad sense. For example, a "connection" may be a fixed connection, a detachable connection, or an integrated structure, may be a direct connection, or may be an indirect connection by using an intermediary.

Embodiment 1

An embodiment may provide a method for controlling a three-level inverter. The following provides description with reference to the accompanying drawings.

Figure 3:
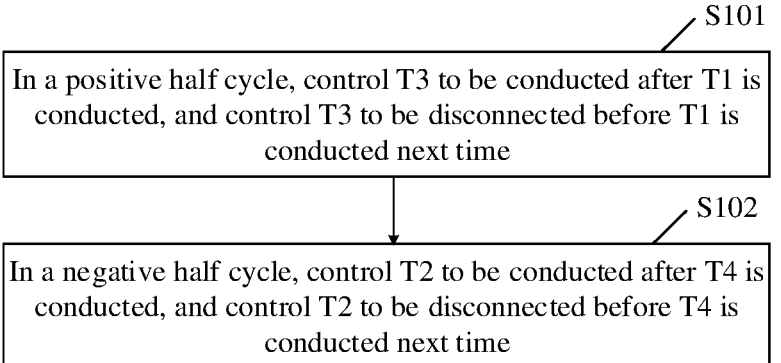
FIG. 3 is a flowchart of a method for controlling a three-level inverter.

FIG. 3 is a flowchart of a method for controlling a three-level inverter.

The method is applied to a three-level inverter. For an implementation of the three-level inverter, refer to FIG. 1.

The three-level inverter 10 includes six controllable switch components T1 to T6. Each of the controllable switch components includes an anti-parallel connected diode and a junction capacitor. A first terminal of T1 is connected to a positive direct current bus, a second terminal of T4 is connected to a negative direct current bus, a second terminal of T1 is connected to first terminals of T2 and T5, a first terminal of T4 is connected to second terminals of T3 and T6, a second terminal of T2 and a first terminal of T3 are connected to a direct current bus midpoint, and a second terminal of T5 and a first terminal of T6 are connected together to form a bridge arm terminal.

For ease of description, the following embodiments are described by using an example in which the controllable switch components T1 to T6 are insulated gate bipolar transistors (IGBT). When the controllable switch component has a body diode (also referred to as a parasitic diode), the diode anti-parallel connected to the controllable switch component is a body diode of the controllable switch component. When the controllable switch component does not have a body diode, the diode anti-parallel connected to the controllable switch component is an external diode. Further, the controllable switch component may alternatively be another type of device, and principles are not separately described herein in this embodiment. Junction capacitors of the controllable switch components T1 to T6 are respectively C1 to C6.

The method may be implemented by a controller of the three-level inverter and may include the following steps:

S101: In a positive half cycle, control T3 to be conducted after T1 is conducted, and control T3 to be disconnected before T1 is conducted next time.

S102: In a negative half cycle, control T2 to be conducted after T4 is conducted, and control T2 to be disconnected before T4 is conducted next time.

Figure 4:
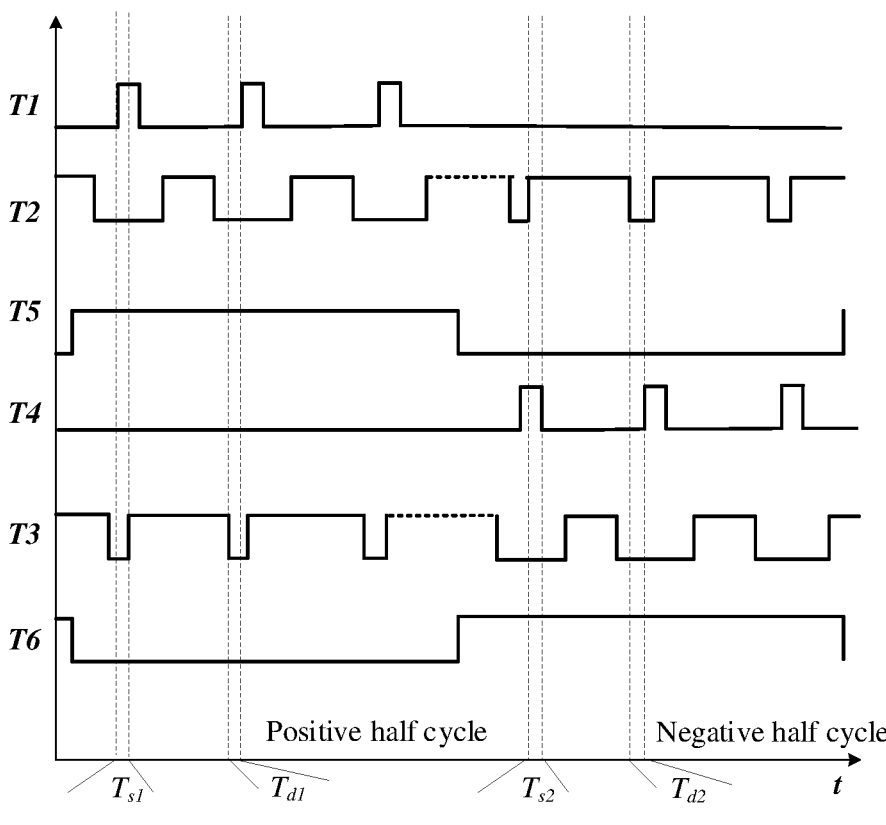
FIG. 4 is a control sequence diagram corresponding to FIG. 3.

FIG. 4 is a control sequence diagram corresponding to FIG. 3.

The following describes a principle of the method with reference to FIG. 4.

First, a working principle of working in the positive half cycle is described.

Figure 5:
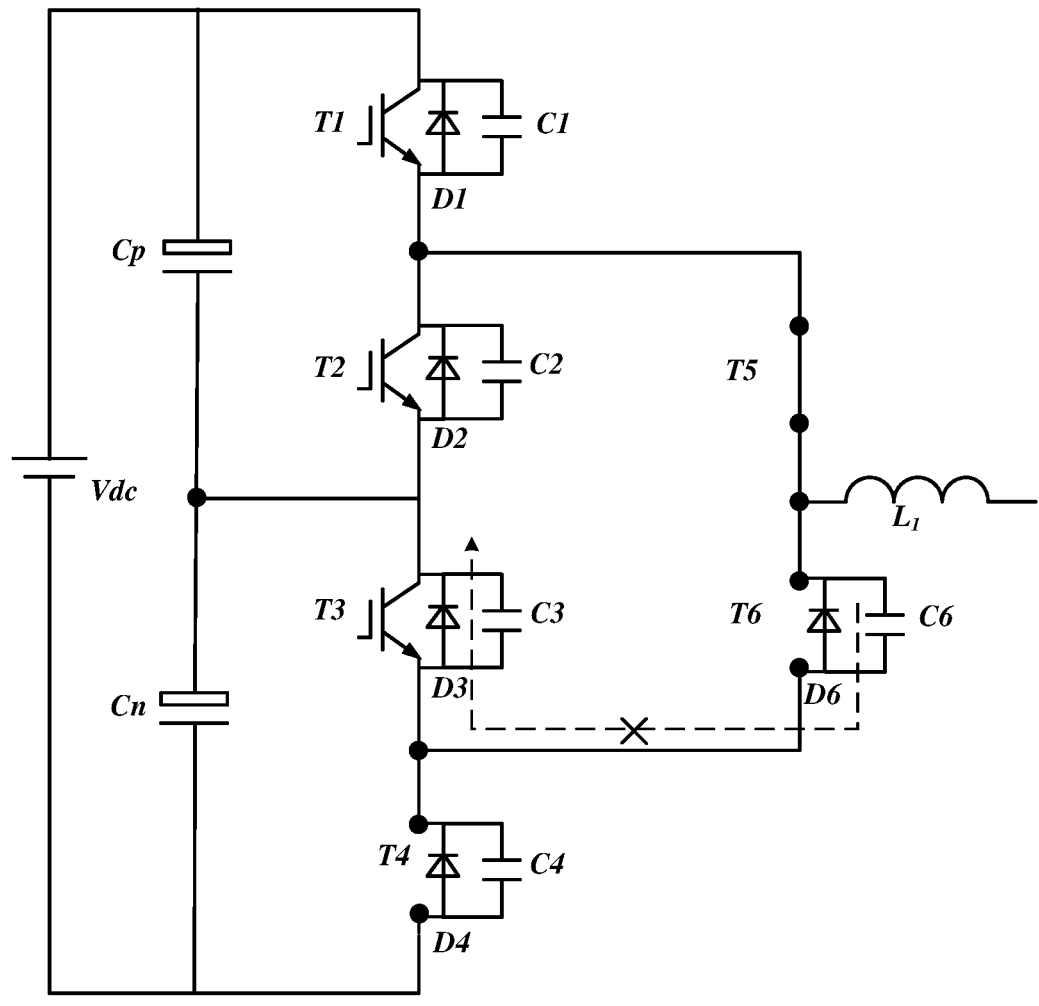
FIG. 5 is an equivalent circuit diagram of a three-level inverter working in a positive half cycle.

FIG. 5 is an equivalent circuit diagram of a three-level inverter working in a positive half cycle.

When working in the positive half cycle, T1 and T2 are alternately conducted at a complementary switching frequency, T5 is conducted, and T4 and T6 remain disconnected.

In S101, T3 is controlled to be conducted after T1 is conducted, and a corresponding time interval shown in the figure is Ts1. In this case, T2 is disconnected, and two terminals of T4 are respectively connected to the direct current bus midpoint and the negative direct current bus. Therefore, a voltage at the two terminals of T4 is clamped to a half of the direct current bus voltage.

One terminal of T6 is connected to the positive direct current bus by using the conducted T1, and the other terminal is connected to the direct current bus midpoint by using the conducted T3. Therefore, a voltage at the two terminals of T6 is also clamped to a half of the direct current bus voltage, to implement voltage balance with T4.

In S101, T1 and T3 are not conducted synchronously because the controllable switch components have discreteness. When T1 and T3 are controlled synchronously to be conducted by using a control signal, T3 may be conducted first. If T3 is conducted before T1, when T1 is conducted, a current already passes through a loop in which T3 and D6 are located. A voltage spike caused by reverse recovery of D6 causes a problem of overstress to the voltage at the two terminals of T6.

In this method, T3 is further controlled to be disconnected before T1 is conducted next time. A corresponding time interval shown in the figure is Td1. The current of the loop in which D6 and T3 are located is blocked by disconnecting T3 in advance, that is, the loop shown by a dashed line in FIG. 5 is blocked, and a problem of a voltage spike caused by reverse recovery of D6 is avoided when dynamic voltage balance between T4 and T6 is implemented.

The following describes a working principle in the negative half cycle.

Figure 6:
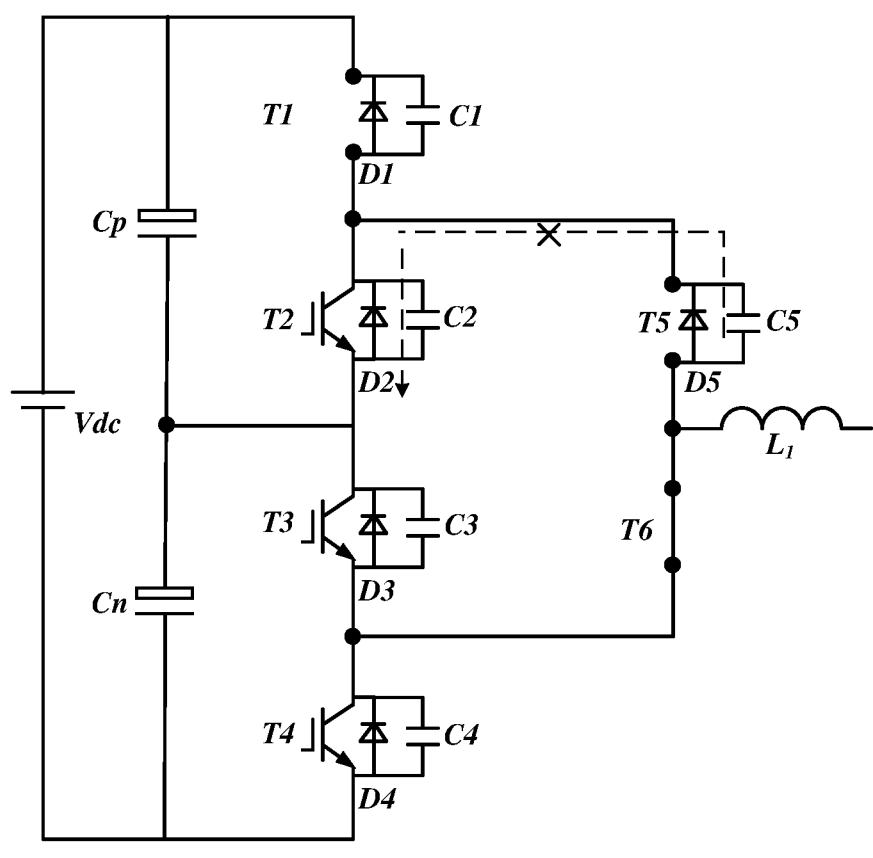
FIG. 6 is an equivalent circuit diagram of a three-level inverter working in a negative half cycle.

FIG. 6 is an equivalent circuit diagram of a three-level inverter working in a negative half cycle.

When working in the negative half cycle, T3 and T4 are alternately conducted at a complementary switching frequency, T6 is conducted, and T1 and T5 remain disconnected.

In S102, T2 is controlled to be conducted after T4 is conducted, and a corresponding time interval shown in the figure is Ts2. In this case, T3 is disconnected, and two terminals of T1 are respectively connected to the positive direct current bus and the direct current bus midpoint. Therefore, a voltage at the two terminals of T1 is clamped to a half of the direct current bus voltage.

One terminal of T5 is connected to the negative direct current bus by using the conducted T4, and the other terminal is connected to the direct current bus midpoint by using the conducted T2. Therefore, a voltage at the two terminals of T5 is also clamped to a half of the direct current bus voltage, to implement voltage balance with T1.

In S102, T2 and T4 are not conducted synchronously because the controllable switch components have discreteness. When T2 and T4 are controlled synchronously to be conducted by using a control signal, T2 may be conducted first. If T2 is conducted before T4, when T4 is conducted, a current already passes through a loop in which T2 and D5 are located. A voltage spike caused by reverse recovery of D5 causes a problem of overstress to the voltage at the two terminals of T5.

In this method, T2 is further controlled to be disconnected before T4 is conducted next time. A corresponding time interval shown in the figure is Td2. The current of the loop in which D5 and T2 are located is blocked by disconnecting T2 in advance, that is, the loop shown by a dashed line in FIG. 6 is blocked, and a problem of a voltage spike caused by reverse recovery of D5 is avoided when dynamic voltage balance between T1 and T5 is implemented.

Figure 7:
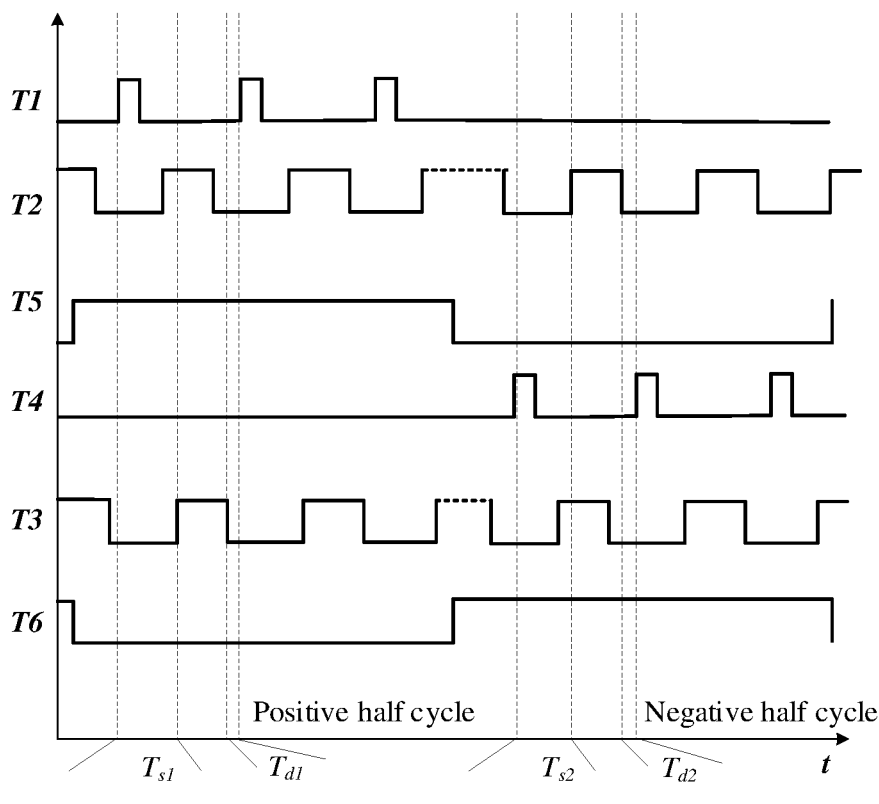
FIG. 7 is another control sequence diagram corresponding to FIG. 3.

FIG. 7 is another control sequence diagram corresponding to FIG. 3.

A difference between this diagram and the control sequence shown in FIG. 4 lies in that: Ts1 and Ts2 in FIG. 4 are relatively short, but Ts1 and Ts2 in FIG. 7 are relatively long. A principle of the control sequence in this diagram is similar to that described above. Details are not described in this embodiment again.

The foregoing intervals Ts1 and Ts2 may be the same or may be different. The foregoing intervals Td1 and Td2 may be the same or may be different. A value of the interval is not limited in this embodiment. In some embodiments, in consideration of symmetry of a circuit structure of the three-level inverter and simplification of a control signal, Ts1 and Ts2 may be set to be the same, and Td1 and Td2 may be set to be the same. For ease of description, in the following embodiments, control sequences in the positive half cycle and the negative half cycle are symmetrical relative to the structure of the three-level inverter. For example, T1 in the positive half cycle is correspondingly the same as T1 in the negative half cycle, and a control sequence of T3 in the positive half cycle is correspondingly the same as a control sequence of T2 in the negative half cycle.

With reference to the control sequences shown in FIG. 4 and FIG. 7, in a period in which a bridge arm voltage is at a zero level, because T2 and T3 have a common conduction time, that is, dual-channel freewheeling is performed in the zero-level period, a conduction loss in the zero-level period is further reduced, and efficiency of the three-level inverter is improved.

In conclusion, by using the control method provided in this embodiment, in the positive half cycle, a problem of a voltage spike caused by reverse recovery of the diode of T6 is avoided when dynamic voltage balance between T4 and T6 is implemented. In addition, in the negative half cycle, a problem of a voltage spike caused by reverse recovery of the diode of T5 is avoided when dynamic voltage balance between T1 and T5 is implemented. In addition, a conduction loss in the zero-level period is further reduced, and efficiency of the three-level inverter is improved.

A working state of each controllable switch component in the three-level inverter is controlled by a control signal sent by a controller, and a waveform of the control signal is a signal waveform in the foregoing sequence diagram. In some embodiments, in the positive half cycle, a control signal of T3 may be obtained by converting a control signal of T2, and in the negative half cycle, the control signal of T2 may be obtained by converting the control signal of T3. The conversion includes conversion of a duty cycle and/or a phase. For example, in the positive half cycle, a signal obtained after phase shift adjustment is performed on the control signal of T2 is used as the control signal of T3.

In some other embodiments, control signals of the controllable switch components are separately set, and the controller controls the controllable switch components by using the set control signals. The setting process may be manually completed or may be actively detected and configured by a device. This is not limited in this embodiment. The control signals may be set as follows: In the positive half cycle, a duty cycle of a control signal of T3 increases or decreases relative to a duty cycle of a control signal of T2; and in the negative half cycle, the duty cycle of the control signal of T2 increases or decreases relative to the duty cycle of the control signal of T3. In addition, the control signals may alternatively be set as follows: In the positive half cycle, the control signal of T3 is phase-shifted relative to the control signal of T2; and in the negative half cycle, the control signal of T2 is phase-shifted relative to the control signal of T3. The foregoing settings of the phase shift and the duty cycle may exist at the same time or only one of the settings may be performed.

In conclusion, the control signals of T2 and T3 may be obtained in the foregoing two implementations. The following describes implementations with reference to control signals of T2 and T3.

Embodiment 2

Figure 8:
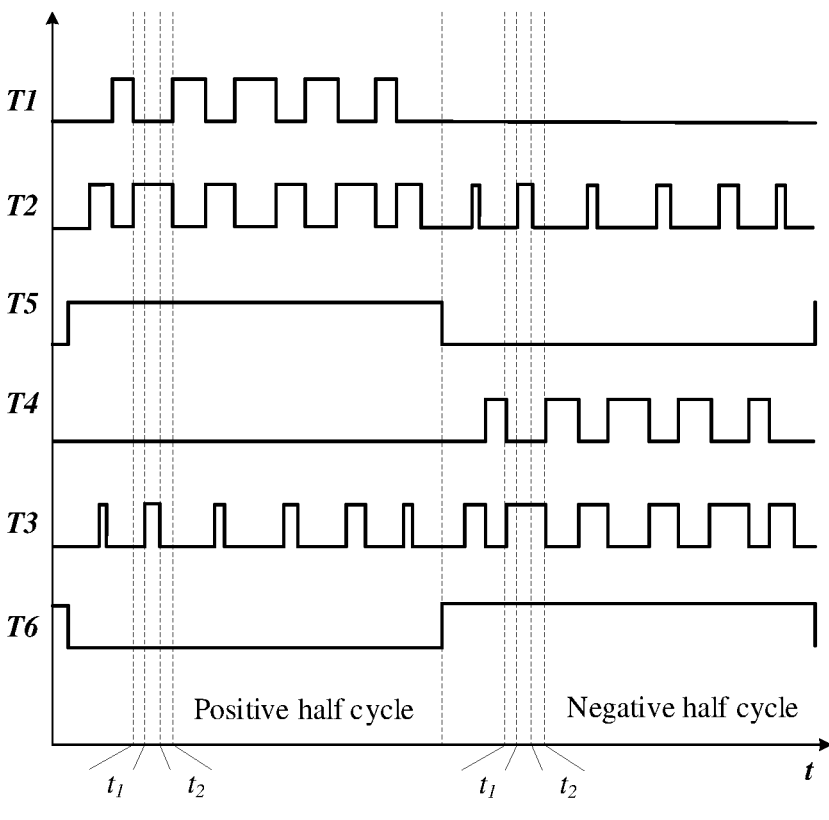
FIG. 8 is still another control sequence diagram.

FIG. 8 is still another control sequence diagram.

In the positive half cycle, a rising edge of the control signal of T3 is enabled to delay relative to a rising edge of the control signal of T2 by a first preset time t1, and a falling edge of the control signal of T3 is enabled to advance relative to a falling edge of the control signal of T2 by a second preset time t2. Even if T3 is conducted in the first preset time t1 after T2 is conducted, T3 is disconnected in the second preset time t2 before T2 is disconnected.

In the negative half cycle, the rising edge of the control signal of T2 is enabled to delay relative to the rising edge of the control signal of T3 by the first preset time t1, and the falling edge of the control signal of T2 is enabled to advance relative to the falling edge of the control signal of T3 by the second preset time t2. Even if T2 is conducted in the first preset time t1 after T3 is conducted, T2 is disconnected in the second preset time t2 before T3 is disconnected.

The first preset time t1 and the second preset time t2 may be set based on an actual situation. This is not limited in this embodiment. However, when t1 is equal to t2, in the positive half cycle, a duty cycle of the control signal of T3 is adjusted relative to a duty cycle of the control signal of T2, and in the negative half cycle, the duty cycle of the control signal of T2 is adjusted relative to the duty cycle of the control signal of T3; when t1 is greater than t2, in the positive half cycle, a phase of the control signal of T3 is shifted rightward (also referred to as a backward shift or a delay) relative to a phase of the control signal of T2, and in the negative half cycle, the phase of the control signal of T2 is further shifted rightward relative to the phase of the control signal of T3; and when t1 is less than t2, in the positive half cycle, the phase of the control signal of T3 is shifted leftward (also referred to as a forward shift or a lead) relative to the phase of the control signal of T2, and in the negative half cycle, the phase of the control signal of T2 is shifted leftward relative to the phase of the control signal of T3.

According to the control method provided in this embodiment, in the positive half cycle, a problem of a voltage spike caused by reverse recovery of the diode of T6 is avoided when dynamic voltage balance between T4 and T6 is implemented. In addition, in the negative half cycle, a problem of a voltage spike caused by reverse recovery of the diode of T5 is avoided when dynamic voltage balance between T1 and T5 is implemented. In addition, a conduction loss in the zero-level period is further reduced, and efficiency of the three-level inverter is improved.

Embodiment 3

Figure 9:
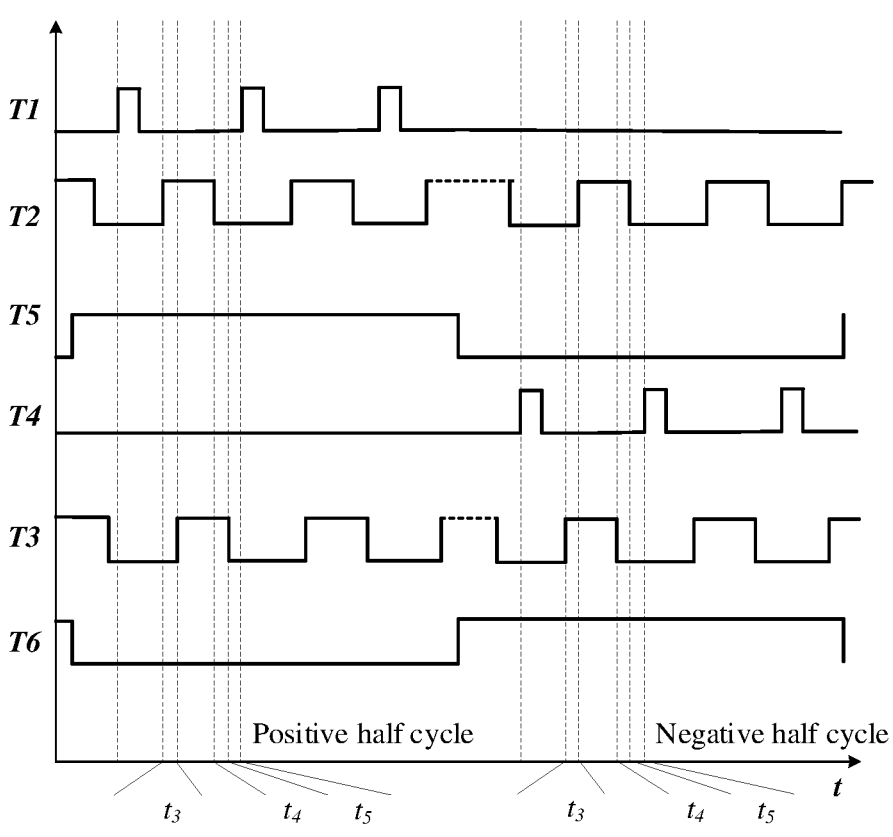
FIG. 9 is yet another control sequence diagram.

FIG. 9 is yet another control sequence diagram.

In the positive half cycle, a rising edge of the control signal of T3 is enabled to delay relative to a rising edge of the control signal of T2 by a third preset time t3, and a falling edge of the control signal of T3 is enabled to delay relative to a falling edge of the control signal of T2 by a fourth preset time t4, and advance relative to a next rising edge of a control signal of T1 by a fifth preset time t5.

The fifth preset time is used to ensure that T3 is already disconnected when T1 is conducted next time.

In the negative half cycle, the rising edge of the control signal of T2 is enabled to delay relative to the rising edge of the control signal of T3 by the third preset time t3; and the falling edge of the control signal of T2 is enabled to delay relative to the falling edge of the control signal of T3 by the fourth preset time t4, and advance relative to a next rising edge of a control signal of T4 by the fifth preset time t5.

The fifth preset time is used to ensure that T2 is already disconnected when T4 is conducted next time.

t3 and t4 may be the same or may be different. This is not limited in this embodiment. However, when t3 is equal to t4, in the positive half cycle, the control signal of T3 is only backward shifted on the phase relative to the control signal of T2, and in the negative half cycle, the control signal of T2 is only backward shifted on the phase relative to the control signal of T3. When t3 is not equal to t4, a duty cycle of the control signal of T3 further changes relative to a duty cycle of the control signal of T2.

According to the control method provided in this embodiment, in the positive half cycle, a problem of a voltage spike caused by reverse recovery of the diode of T6 is avoided when dynamic voltage balance between T4 and T6 is implemented. In addition, in the negative half cycle, a problem of a voltage spike caused by reverse recovery of the diode of T5 is avoided when dynamic voltage balance between T1 and T5 is implemented. In addition, a conduction loss in the zero-level period is further reduced, and efficiency of the three-level inverter is improved.

In addition, in the positive half cycle, after T2 is disconnected, T3 is not disconnected and is still in a conducting state, and therefore, a reverse recovery loss of the diode D3 anti-parallel connected to T3 is eliminated. In the negative half cycle, after T3 is disconnected, T2 is not disconnected and is still in a conducting state, and therefore a reverse recovery loss of the diode D2 anti-parallel connected to T2 is eliminated, so that an overall loss of the controllable switch components is reduced and electromagnetic compatibility (Electromagnetic Compatibility, EMC) is improved.

Embodiment 4

Figure 10:
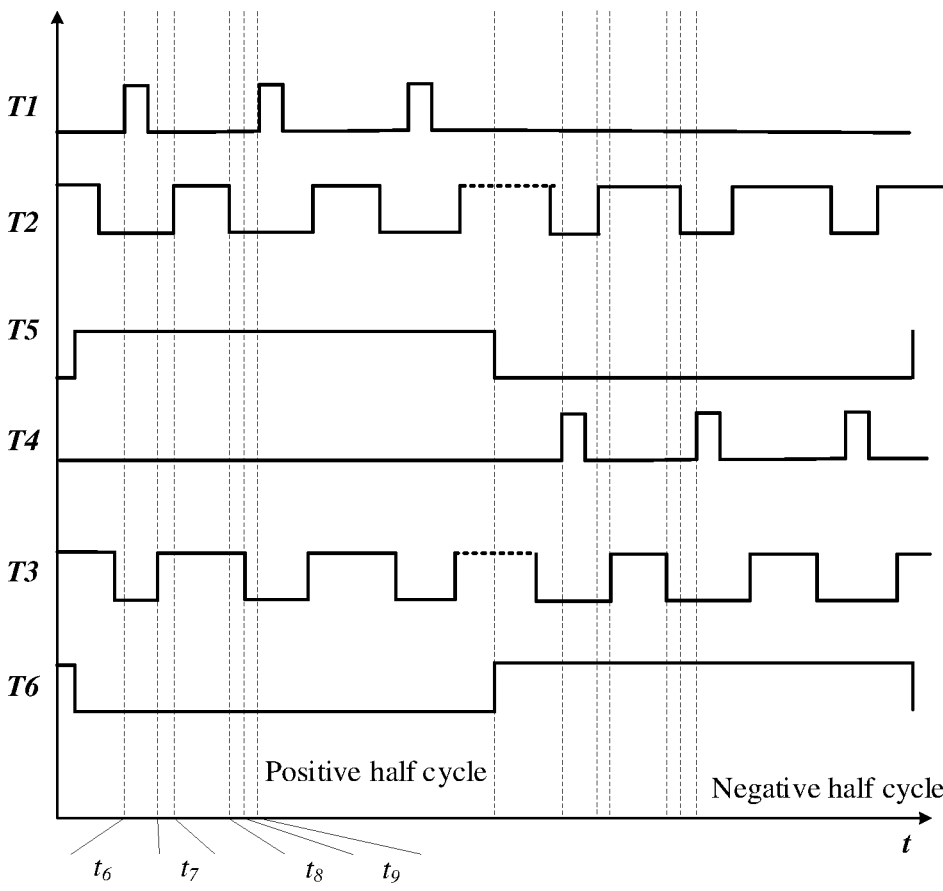
FIG. 10 is another control sequence diagram.

FIG. 10 is another control sequence diagram.

In the positive half cycle, a rising edge of the control signal of T3 is enabled to delay relative to a rising edge of the control signal of T1 by a sixth preset time t6, and advance relative to a rising edge of the control signal of T2 by a seventh preset time t7.

The sixth preset time t6 is used to ensure that T1 is already conducted when T3 is conducted.

A falling edge of the control signal of T3 is further enabled to delay relative to a falling edge of the control signal of T2 by an eighth preset time t8, and advance relative to a next rising edge of the control signal of T1 by a ninth preset time t9.

The ninth preset time is used to ensure that T3 is already disconnected when T1 is conducted next time.

In the negative half cycle, the rising edge of the control signal of T2 is enabled to delay relative to a rising edge of a control signal of T4 by the sixth preset time t6, and advance relative to the rising edge of the control signal of T3 by the seventh preset time t7.

The sixth preset time is used to ensure that T4 is already conducted when T2 is conducted.

The falling edge of the control signal of T2 is enabled to delay relative to the falling edge of the control signal of T3 by the eighth preset time t8, and advance relative to a next rising edge of the control signal of T4 by the ninth preset time t9.

The ninth preset time t9 is used to ensure that T2 is already disconnected when T4 is conducted next time.

The sixth preset time t6 and the ninth preset time t9 may be the same or may be different. This is not limited in this embodiment. In some embodiments, in consideration of symmetry of a circuit structure of the three-level inverter and simplification of a control signal, the sixth preset time and the ninth preset time are the same.

In addition, t7 and t8 may be set based on an actual situation. This is not limited in this embodiment. However, when t7 is less than t8, in the positive half cycle, a phase of the control signal of T3 is shifted rightward relative to a phase of the control signal of T2, and in the negative half cycle, the phase of the control signal of T2 is shifted rightward relative to the phase of the control signal of T3; and when t1 is greater than t2, in the positive half cycle, the phase of the control signal of T3 is shifted leftward relative to the phase of the control signal of T2, and in the negative half cycle, the phase of the control signal of T2 is shifted leftward relative to the phase of the control signal of T3.

According to the control method provided in this embodiment, in the positive half cycle, a problem of a voltage spike caused by reverse recovery of the diode of T6 is avoided when dynamic voltage balance between T4 and T6 is implemented. In addition, in the negative half cycle, a problem of a voltage spike caused by reverse recovery of the diode of T5 is avoided when dynamic voltage balance between T1 and T5 is implemented. In addition, a conduction loss in the zero-level period is further reduced, and efficiency of the three-level inverter is improved.

In addition, in the positive half cycle, after T2 is disconnected, T3 is not disconnected and is still in a conducting state, and therefore, a reverse recovery loss of the diode D3 anti-parallel connected to T3 is eliminated. In the negative half cycle, after T3 is disconnected, T2 is not disconnected and is still in a conducting state, and therefore a reverse recovery loss of the diode D2 anti-parallel connected to T2 is eliminated, so that an overall loss of the controllable switch components is reduced and electromagnetic compatibility is improved.

Embodiment 5

Figure 11:
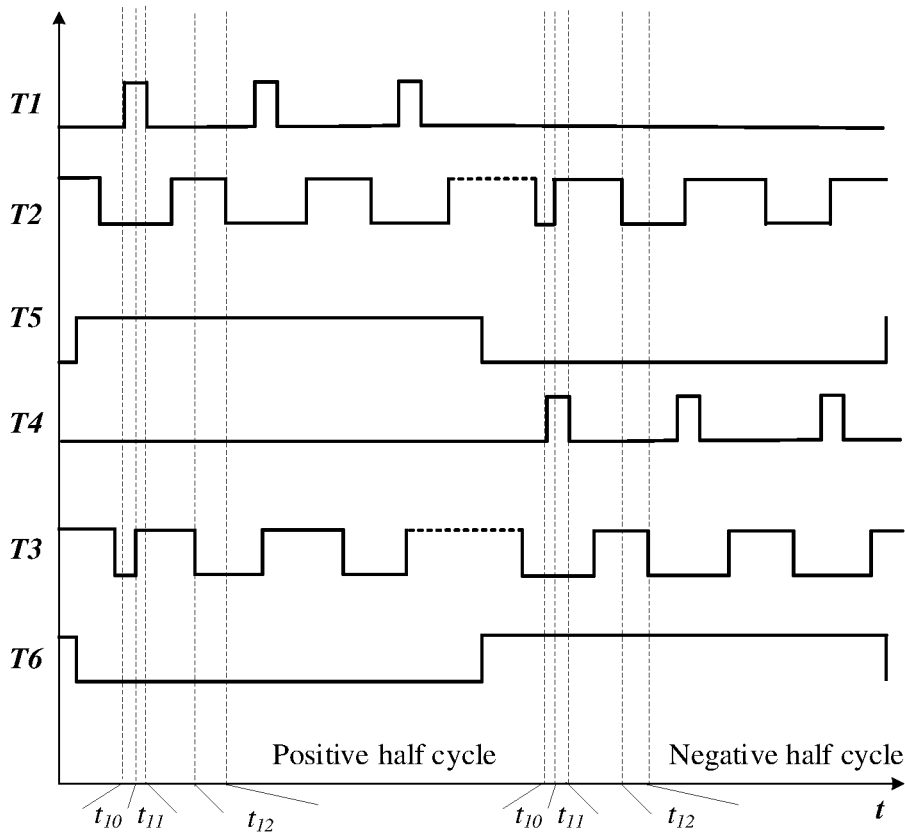
FIG. 11 is still another control sequence diagram.

FIG. 11 is still another control sequence diagram according to an embodiment.

In the positive half cycle, a rising edge of the control signal of T3 is enabled to delay relative to a rising edge of a control signal of T1 by a tenth preset time t10, and advance relative to a falling edge of the control signal of T1 by an eleventh preset time al. The tenth preset time t10 is used to ensure that T1 is already conducted when T3 is conducted.

A falling edge of the control signal of T3 is enabled to advance relative to a falling edge of the control signal of T2 by a twelfth preset time t12.

In this case, a phase of the control signal of T3 may be obtained by shifting a phase of the control signal of T2 forward.

In the negative half cycle, a rising edge of the control signal of T2 is enabled to delay relative to a rising edge of a control signal of T4 by the tenth preset time t10, and advance relative to a falling edge of the control signal of T4 by the eleventh preset time al. The tenth preset time t10 is used to ensure that T4 is already conducted when T2 is conducted.

The falling edge of the control signal of T2 is enabled to advance relative to the falling edge of the control signal of T3 by the twelfth preset time t12.

In this case, the phase of the control signal of T3 may be obtained by shifting the phase of the control signal of T2 forward.

The eleventh preset time t11 and the twelfth preset time t12 may be set based on an actual situation. This is not limited in this embodiment.

According to the control method provided in this embodiment, in the positive half cycle, a problem of a voltage spike caused by reverse recovery of the diode of T6 is avoided when dynamic voltage balance between T4 and T6 is implemented. In addition, in the negative half cycle, a problem of a voltage spike caused by reverse recovery of the diode of T5 is avoided when dynamic voltage balance between T1 and T5 is implemented. In addition, a conduction loss in the zero-level period is further reduced, and efficiency of the three-level inverter is improved.

Embodiment 6

Figure 12:
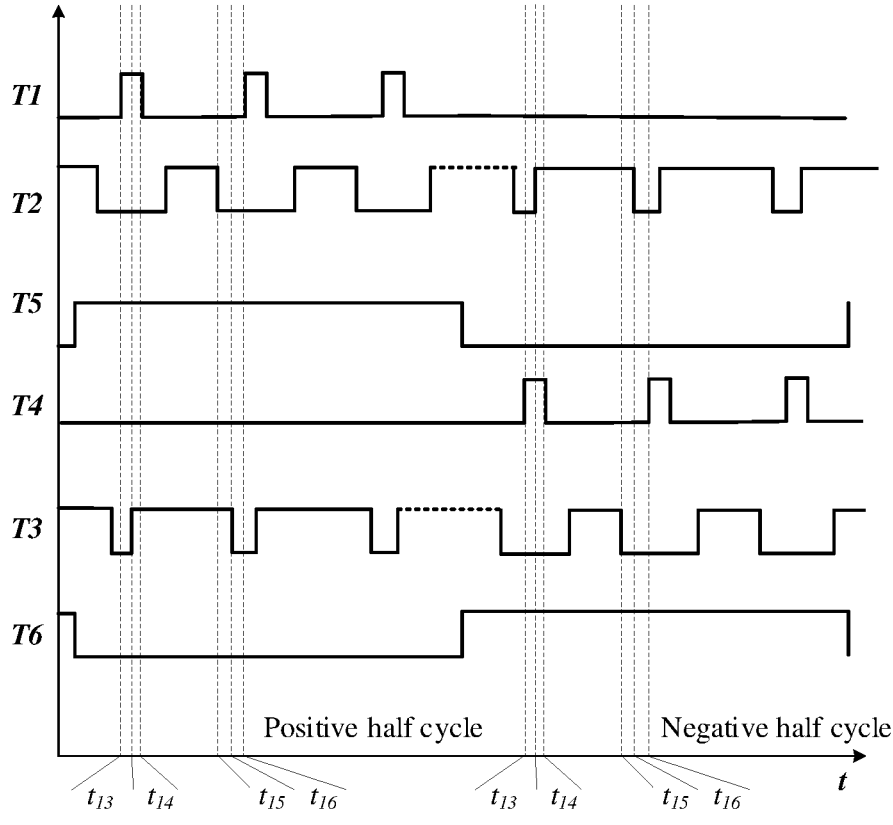
FIG. 12 is yet another control sequence diagram.

FIG. 12 is yet another control sequence diagram.

In the positive half cycle, a rising edge of the control signal of T3 is enabled to delay relative to a rising edge of a control signal of T1 by a thirteenth preset time t13, and advance relative to a falling edge of the control signal of T1 by a fourteenth preset time t14. The thirteenth preset time t13 is used to ensure that T1 is already conducted when T3 is conducted.

A falling edge of the control signal of T3 is enabled to delay relative to a falling edge of the control signal of T2 by a fifteenth preset time t15, and advance relative to a next rising edge of the control signal of T1 by a sixteenth preset time t16. The sixteenth preset time t16 is used to ensure that T3 is already disconnected when T1 is conducted next time.

In the negative half cycle, a rising edge of the control signal of T2 is enabled to delay relative to a rising edge of a control signal of T4 by the thirteenth preset time t13, and advance relative to a falling edge of the control signal of T4 by the fourteenth preset time t14. The thirteenth preset time is used to ensure that T4 is already conducted when T2 is conducted.

The falling edge of the control signal of T2 is enabled to delay relative to the falling edge of the control signal of T3 by the fifteenth preset time t15, and advance relative to a next rising edge of the control signal of T4 by the sixteenth preset time t16. The sixteenth preset time t16 is used to ensure that T2 is already disconnected when T4 is conducted next time.

The thirteenth preset time t13 and the sixteenth preset time t16 may be the same or may be different. This is not limited in this embodiment. In some embodiments, in consideration of symmetry of a circuit structure of the three-level inverter and simplification of a control signal, the thirteenth preset time t13 and the sixteenth preset time t16 are the same.

According to the control method provided in this embodiment, in the positive half cycle, a problem of a voltage spike caused by reverse recovery of the diode of T6 is avoided when dynamic voltage balance between T4 and T6 is implemented. In addition, in the negative half cycle, a problem of a voltage spike caused by reverse recovery of the diode of T5 is avoided when dynamic voltage balance between T1 and T5 is implemented. In addition, a conduction loss in the zero-level period is further reduced, and efficiency of the three-level inverter is improved.

In addition, in the positive half cycle, after T2 is disconnected, T3 is not disconnected and is still in a conducting state, and therefore, a reverse recovery loss of the diode D3 anti-parallel connected to T3 is eliminated. In the negative half cycle, after T3 is disconnected, T2 is not disconnected and is still in a conducting state, and therefore a reverse recovery loss of the diode D2 anti-parallel connected to T2 is eliminated, so that an overall loss of the controllable switch components is reduced and electromagnetic compatibility is improved.

In the foregoing embodiments, in the positive half cycle, when the rising edge of T3 precedes the rising edge of T2, the voltage at the two terminals of T4 may be clamped to a half of the direct current bus voltage before T2 is conducted, to avoid voltage overstress at the two terminals of T4 in a control process. Similarly, in the negative half cycle, when the rising edge of T2 precedes the rising edge of T3, the voltage at the two terminals of T1 may be clamped to a half of the direct current bus voltage before T3 is conducted, to avoid voltage overstress at the two terminals of T1 in a control process.

In the foregoing embodiments, in the positive half cycle, because T1 and T2 are alternately conducted, when the rising edge of the control signal of T3 lags behind the rising edge of the control signal of T2, T1 is already conducted; or when the falling edge of the control signal of T3 precedes the falling edge of the control signal of T2, T3 is already disconnected before T1 is conducted next time. Similarly, in the negative half cycle, because T3 and T4 are alternately conducted, when the rising edge of the control signal of T2 lags behind the rising edge of the control signal of T3, T4 is already conducted; or when the falling edge of the control signal of T2 precedes the falling edge of the control signal of T3, T2 is already disconnected before T4 is conducted next time.

Embodiment 7

Based on the method for controlling a three-level inverter provided in the foregoing embodiments, an embodiment may further provide a three-level inverter to which the control method is applied. The following provides descriptions with reference to the accompanying drawings.

Figure 13:
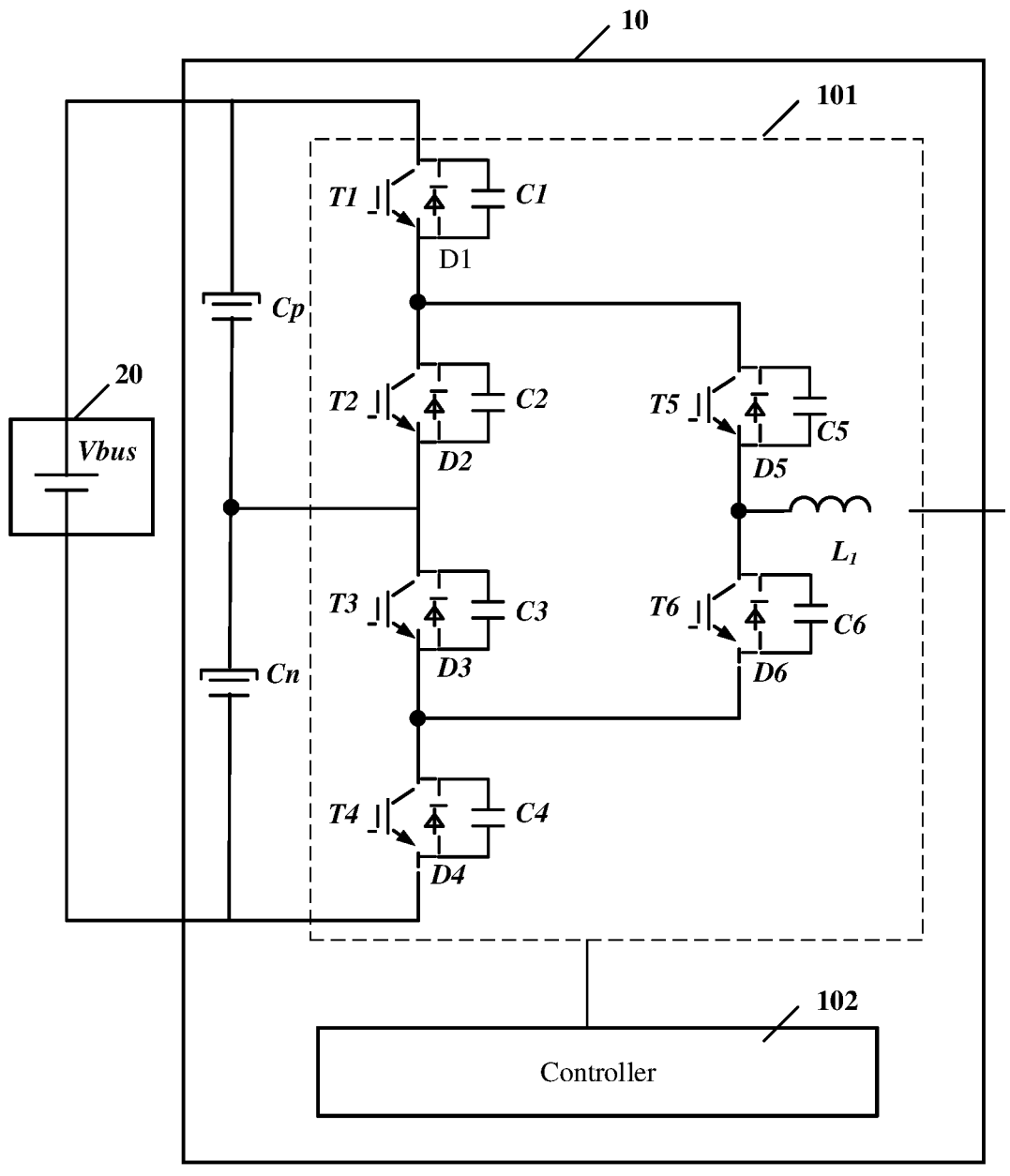
FIG. 13 is a schematic diagram of a three-level inverter.

FIG. 13 is a schematic diagram of a three-level inverter.

The three-level inverter 10 includes bus capacitors Cp and Cn, a power conversion circuit 101, and a controller 102.

The power conversion circuit 101 includes controllable switch components T1 to T6. Each of the controllable switch components includes an anti-parallel connected diode and a junction capacitor. A first terminal of T1 is connected to a positive direct current bus, a second terminal of T4 is connected to a negative direct current bus, a second terminal of T1 is connected to first terminals of T2 and T5, a first terminal of T4 is connected to second terminals of T3 and T6, a second terminal of T2 and a first terminal of T3 are connected to a direct current bus midpoint, and a second terminal of T5 and a first terminal of T6 are connected together to form a bridge arm terminal.

The controller 102 controls working states of the controllable switch components T1 to T6 by sending control signals.

In a positive half cycle, the controller 102 controls T3 to be conducted after T1 is conducted, and controls T3 to be disconnected before T1 is conducted next time; and in a negative half cycle, the controller 102 controls T2 to be conducted after T4 is conducted, and controls T2 to be disconnected before T4 is conducted next time. The following provides detailed descriptions.

When the three-level inverter works in the positive half cycle, the controller 102 controls T1 and T2 to be alternately conducted at a complementary switching frequency, T5 is conducted, and T4 and T6 remain disconnected.

The controller 102 controls T3 to be conducted after T1 is conducted. In this case, T2 is disconnected, and two terminals of T4 are respectively connected to the direct current bus midpoint and the negative direct current bus. Therefore, a voltage at the two terminals of T4 is clamped to a half of the direct current bus voltage.

One terminal of T6 is connected to the positive direct current bus by using the conducted T1, and the other terminal is connected to the direct current bus midpoint by using the conducted T3. Therefore, a voltage at the two terminals of T6 is also clamped to a half of the direct current bus voltage, to implement voltage balance with T4.

The controller 102 does not control T1 and T3 to be conducted synchronously, because the controllable switch components have discreteness. When T1 and T3 are controlled synchronously to be conducted, T3 may be conducted first. If T3 is conducted before T1, when T1 is conducted, a current already passes through a loop in which T3 and D6 are located. A voltage spike caused by reverse recovery of D6 causes overstress to the voltage at the two terminals of T6.

The controller 102 further controls T3 to be disconnected before T1 is conducted next time. The current of the loop in which D6 and T3 are located is blocked by disconnecting T3 in advance, so that a problem of a voltage spike caused by reverse recovery of D6 is avoided when dynamic voltage balance between T4 and T6 is implemented.

When the three-level inverter works in the negative half cycle, the controller 102 controls T3 and T4 to be alternately conducted at a complementary switching frequency, T6 is conducted, and T1 and T5 remain disconnected.

The controller 102 controls T2 to be conducted after T4 is conducted. In this case, T3 is disconnected, and two terminals of T1 are respectively connected to the positive direct current bus and the direct current bus midpoint. Therefore, a voltage at the two terminals of T1 is clamped to a half of the direct current bus voltage.

One terminal of T5 is connected to the negative direct current bus by using the conducted T4, and the other terminal is connected to the direct current bus midpoint by using the conducted T2. Therefore, a voltage at the two terminals of T5 is also clamped to a half of the direct current bus voltage, to implement voltage balance with T1.

The controller 102 does not control T2 and T4 to be conducted synchronously, because the controllable switch components have discreteness. When T2 and T4 are controlled synchronously to be conducted, T2 may be conducted first. If T2 is conducted before T4, when T4 is conducted, a current already passes through a loop in which T2 and D5 are located. A voltage spike caused by reverse recovery of D5 causes a problem of overstress to the voltage at the two terminals of T5.

The controller 102 further controls T2 to be disconnected before T4 is conducted next time. The current of the loop in which D5 and T2 are located is blocked by disconnecting T2 in advance, so that a problem of a voltage spike caused by reverse recovery of D5 is avoided when dynamic voltage balance between T1 and T5 is implemented.

The controller may be an application-specific integrated circuit (ASIC), a programmable logic device (PLD), a digital signal processor (DSP), or a combination thereof. The PLD may be a complex programmable logic device (CPLD), a field-programmable gate array (FPGA), a generic array logic (GAL), or any combination thereof. This is not limited in this embodiment.

In conclusion, by using the three-level inverter provided in this embodiment, in the positive half cycle, a problem of a voltage spike caused by reverse recovery of the diode of T6 is avoided when dynamic voltage balance between T4 and T6 is implemented. In addition, in the negative half cycle, a problem of a voltage spike caused by reverse recovery of the diode of T5 is avoided when dynamic voltage balance between T1 and T5 is implemented. In addition, a conduction loss in the zero-level period is further reduced, and efficiency of the three-level inverter is improved.

In some embodiments, in the positive half cycle, a control signal of T3 may be obtained by converting a control signal of T2, and in the negative half cycle, the control signal of T2 may be obtained by converting the control signal of T3. The conversion includes conversion of a duty cycle and/or a phase. For example, in the positive half cycle, a signal obtained after phase shift adjustment is performed on the control signal of T2 is used as the control signal of T3.

In some other embodiments, control signals of the controllable switch components are separately set, and the controller controls the controllable switch components by using the set control signals. The setting process may be manually completed or may be actively configured by the controller. This is not limited in this embodiment. The control signals may be set as follows: In the positive half cycle, a duty cycle of a control signal of T3 increases or decreases relative to a duty cycle of a control signal of T2; and in the negative half cycle, the duty cycle of the control signal of T2 increases or decreases relative to the duty cycle of the control signal of T3. In addition, the control signals may alternatively be set as follows: In the positive half cycle, the control signal of T3 is phase-shifted relative to the control signal of T2; and in the negative half cycle, the control signal of T2 is phase-shifted relative to the control signal of T3. The foregoing settings of the phase shift and the duty cycle may exist at the same time or only one of the settings may be performed.

The following provides description with reference to control manners of the controller.

In a first manner, in the positive half cycle, a rising edge of the control signal of T3 is enabled to delay relative to a rising edge of the control signal of T2 by a first preset time t1, and a falling edge of the control signal of T3 is enabled to advance relative to a falling edge of the control signal of T2 by a second preset time t2. Even if T3 is conducted in the first preset time t1 after T2 is conducted, T3 is disconnected in the second preset time t2 before T2 is disconnected.

In the negative half cycle, the rising edge of the control signal of T2 is enabled to delay relative to the rising edge of the control signal of T3 by the first preset time t1, and the falling edge of the control signal of T2 is enabled to advance relative to the falling edge of the control signal of T3 by the second preset time t2. Even if T2 is conducted in the first preset time t1 after T3 is conducted, T2 is disconnected in the second preset time t2 before T3 is disconnected.

The first preset time t1 and the second preset time t2 may be set based on an actual situation. This is not limited in this embodiment.

In a second manner, in the positive half cycle, a rising edge of the control signal of T3 is enabled to delay relative to a rising edge of the control signal of T2 by a third preset time t3, and a falling edge of the control signal of T3 is enabled to delay relative to a falling edge of the control signal of T2 by a fourth preset time t4, and advance relative to a rising edge of a control signal of T1 by a fifth preset time t5.

The fifth preset time is used to ensure that T3 is already disconnected when T1 is conducted next time.

In the negative half cycle, the rising edge of the control signal of T2 is enabled to delay relative to the rising edge of the control signal of T3 by the third preset time t3; and the falling edge of the control signal of T2 is enabled to delay relative to the falling edge of the control signal of T3 by the fourth preset time t4, and advance relative to a rising edge of a control signal of T4 by the fifth preset time t5.

The fifth preset time is used to ensure that T2 is already disconnected when T4 is conducted next time.

t3 and t4 may be the same or may be different. This is not limited in this embodiment.

In a third manner, in the positive half cycle, a rising edge of the control signal of T3 is enabled to delay relative to a rising edge of the control signal of T1 by a sixth preset time t6, and advance relative to a rising edge of the control signal of T2 by a seventh preset time t7.

The sixth preset time t6 is used to ensure that T1 is already conducted when T3 is conducted.

A falling edge of the control signal of T3 is further enabled to delay relative to a falling edge of the control signal of T2 by an eighth preset time t8, and advance relative to a next rising edge of the control signal of T1 by a ninth preset time t9.

The ninth preset time is used to ensure that T3 is already disconnected when T1 is conducted next time.

In the negative half cycle, the rising edge of the control signal of T2 is enabled to delay relative to a rising edge of a control signal of T4 by the sixth preset time t6, and advance relative to the rising edge of the control signal of T3 by the seventh preset time t7.

The sixth preset time is used to ensure that T4 is already conducted when T2 is conducted.

The falling edge of the control signal of T2 is enabled to delay relative to the falling edge of the control signal of T3 by the eighth preset time t8, and advance relative to a next rising edge of the control signal of T4 by the ninth preset time t9.

The ninth preset time t9 is used to ensure that T2 is already disconnected when T4 is conducted next time.

The sixth preset time t6 and the ninth preset time t9 may be the same or may be different. This is not limited in this embodiment.

In a fourth manner, in the positive half cycle, a rising edge of the control signal of T3 is enabled to delay relative to a rising edge of a control signal of T1 by a tenth preset time t10, and advance relative to a falling edge of T1 by an eleventh preset time t11. The tenth preset time t10 is used to ensure that T1 is already conducted when T3 is conducted.

A falling edge of the control signal of T3 is enabled to advance relative to a falling edge of the control signal of T2 by a twelfth preset time t12.

In this case, a phase of the control signal of T3 may be obtained by shifting a phase of the control signal of T2 forward.

In the negative half cycle, a rising edge of the control signal of T2 is enabled to delay relative to a rising edge of a control signal of T4 by the tenth preset time t10, and advance relative to a falling edge of the control signal of T4 by the eleventh preset time t11. The tenth preset time t10 is used to ensure that T4 is already conducted when T2 is conducted.

The falling edge of the control signal of T2 is enabled to advance relative to the falling edge of the control signal of T3 by the twelfth preset time t12.

In this case, the phase of the control signal of T3 may be obtained by shifting the phase of the control signal of T2 forward.

The eleventh preset time t11 and the twelfth preset time t12 may be set based on an actual situation. This is not limited in this embodiment.

In a fifth manner, in the positive half cycle, a rising edge of the control signal of T3 is enabled to delay relative to a rising edge of a control signal of T1 by a thirteenth preset time t13, and advance relative to a falling edge of the control signal of T1 by a fourteenth preset time t14. The thirteenth preset time t13 is used to ensure that T1 is already conducted when T3 is conducted.

A falling edge of the control signal of T3 is enabled to delay relative to a falling edge of the control signal of T2 by a fifteenth preset time t15, and advance relative to a next rising edge of the control signal of T1 by a sixteenth preset time t16. The sixteenth preset time t16 is used to ensure that T3 is already disconnected when T1 is conducted next time.

In the negative half cycle, a rising edge of the control signal of T2 is enabled to delay relative to a rising edge of a control signal of T4 by the thirteenth preset time t13, and advance relative to a falling edge of the control signal of T4 by the fourteenth preset time t14. The thirteenth preset time is used to ensure that T4 is already conducted when T2 is conducted.

The falling edge of the control signal of T2 is enabled to delay relative to the falling edge of the control signal of T3 by the fifteenth preset time t15, and advance relative to a next rising edge of the control signal of T4 by the sixteenth preset time t16. The sixteenth preset time t16 is used to ensure that T2 is already disconnected when T4 is conducted next time.

The thirteenth preset time t13 and the sixteenth preset time t16 may be the same or may be different. This is not limited in this embodiment. In some embodiments, in consideration of symmetry of a circuit structure of the three-level inverter and simplification of a control signal, the thirteenth preset time t13 and the sixteenth preset time t16 are the same.

For the second, third, and fifth implementations, in the positive half cycle, after T2 is disconnected, T3 is not disconnected and is still in a conducting state. Therefore, a reverse recovery loss of the diode D3 anti-parallel connected to T3 is eliminated. In the negative half cycle, after T3 is disconnected, T2 is not disconnected and is still in a conducting state. Therefore, a reverse recovery loss of the diode D2 anti-parallel connected to T2 is eliminated, so that an overall loss of the controllable switch components is reduced and electromagnetic compatibility is improved.

Embodiment 8

Based on the three-level inverter provided in the foregoing embodiments, an embodiment may further provide a photovoltaic power generation system. The following provides descriptions with reference to the accompanying drawing.

Figure 14:
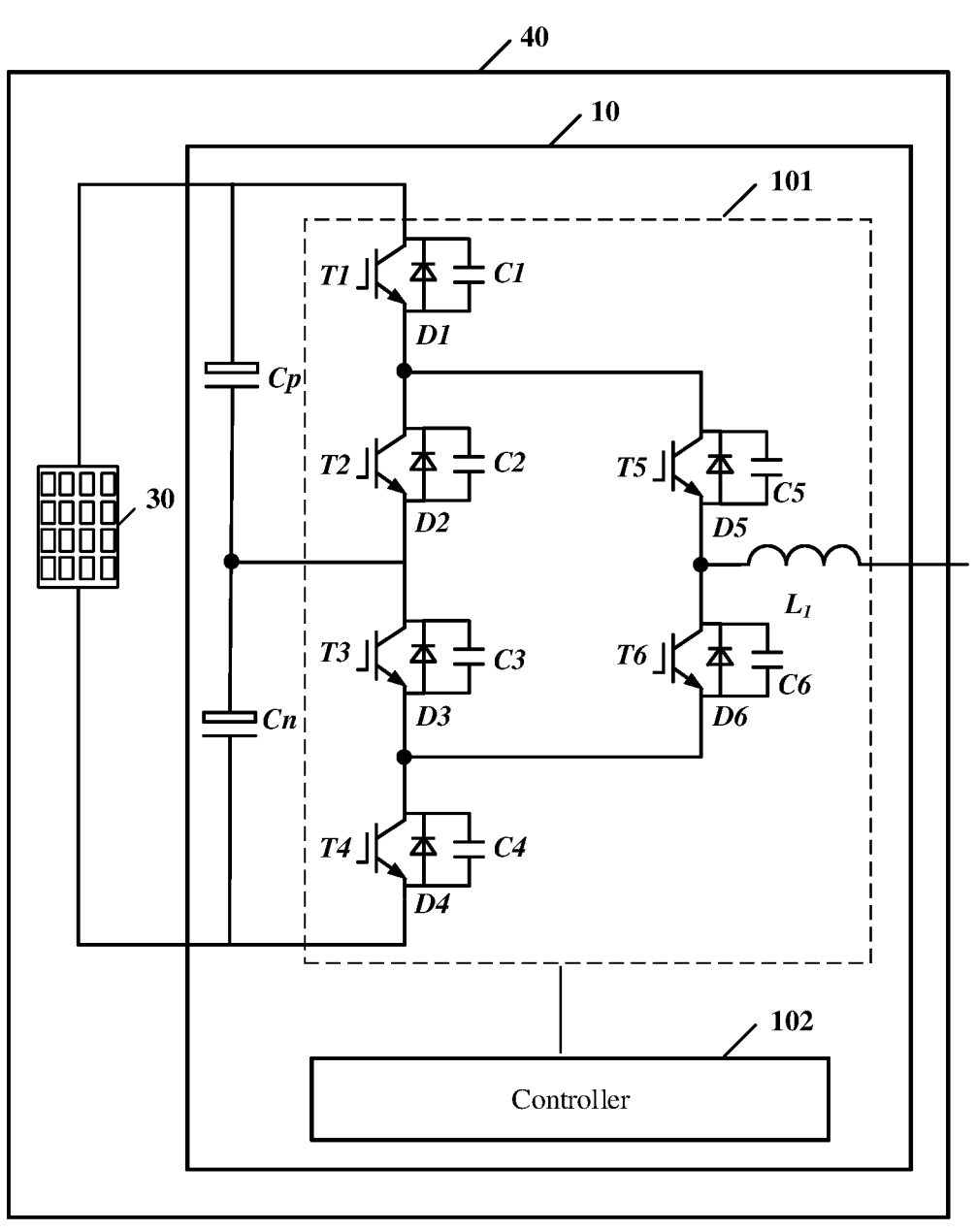
FIG. 14 is a schematic diagram of a photovoltaic power generation system.

FIG. 14 is a schematic diagram of a photovoltaic power generation system.

The photovoltaic power generation system 40 provided in this embodiment includes a photovoltaic unit 30 and a three-level inverter 10.

The three-level inverter 10 includes bus capacitors Cp and Cn. A first terminal of Cp is connected to a positive direct current bus, a second terminal of Cp is connected to a negative direct current bus by using Cn, and a second terminal of Cp is a bus midpoint. A positive input terminal of the three-level inverter 10 is connected to the positive direct current bus, and a negative input terminal of the three-level inverter 10 is connected to the negative direct current bus.

The three-level inverter 10 further includes six controllable switch components T1 to T6. Each of the controllable switch components includes an anti-parallel connected diode and a junction capacitor. A first terminal of T1 is connected to a positive direct current bus, a second terminal of T4 is connected to a negative direct current bus, a second terminal of T1 is connected to first terminals of T2 and T5, a first terminal of T4 is connected to second terminals of T3 and T6, a second terminal of T2 and a first terminal of T3 are connected to a direct current bus midpoint, and a second terminal of T5 and a first terminal of T6 are connected together to form a bridge arm terminal. A controller is further included, where the controller controls working states of the controllable switch components by sending control signals.

The controller 102 may be configured to: in a positive half cycle, control T3 to be conducted after T1 is conducted, and control T3 to be disconnected before T1 is conducted next time; and in a negative half cycle, control T2 to be conducted after T4 is conducted, and control T2 to be disconnected before T4 is conducted next time.

For a working principle of the controller 102, refer to the descriptions in the foregoing embodiments. Details are not described in this embodiment again.

The photovoltaic unit 30 includes a plurality of photovoltaic modules, and an output terminal of the photovoltaic module is connected to an input terminal of the three-level inverter.

The photovoltaic unit 30 is configured to: convert light energy into a direct current and transmit the direct current to the three-level inverter 10.

In conclusion, the photovoltaic power generation system includes the three-level inverter. The controller of the three-level inverter controls, in the positive half cycle, T3 to be conducted after T1 is conducted, to avoid a problem of overstress to the voltage at the two terminals of T6 due to reverse recovery of the diode of T6. The voltage at the two terminals of T4 is clamped to a half of the direct current bus voltage. In this case, T1 and T5 are conducted, so that the voltage at the two terminals of T6 is also clamped to a half of the direct current bus voltage, and T3 is controlled to be disconnected before T1 is conducted next time. The current of the loop in which the diode of T6 and T3 are located is blocked by disconnecting T3 in advance. Therefore, a problem of a voltage spike caused by reverse recovery of the diode of T6 is avoided when dynamic voltage balance between T4 and T6 is implemented. In addition, in the negative half cycle, the controller controls T2 to be conducted after T4 is conducted, to avoid a problem of overstress to the voltage at the two terminals of T5 due to reverse recovery of the diode of T5, and the voltage at the two terminals of T1 is clamped to a half of the direct current bus voltage. In this case, T4 and T6 are conducted, so that the voltage at the two terminals of T5 is also clamped to a half of the direct current bus voltage, and T2 is controlled to be disconnected before T4 is conducted next time. The current of the loop in which the diode of T5 and T2 are located is blocked by disconnecting T2 in advance, so that a problem of a voltage spike caused by reverse recovery of the diode of T5 is avoided when dynamic voltage balance between T1 and T5 is implemented. In addition, in a period in which a bridge arm voltage is at a zero level, because T3 and T2 have a common conduction time, dual-channel freewheeling is performed in the zero-level period. Therefore, a conduction loss in the zero-level period is further reduced, and efficiency of the three-level inverter is improved, so that efficiency of the photovoltaic power generation system is further improved.

In some embodiments, in the positive half cycle, after T2 is disconnected, T3 is not disconnected and is still in a conducting state, and a reverse recovery loss of the diode D3 anti-parallel connected to T3 is further eliminated. In the negative half cycle, after T3 is disconnected, T2 is not disconnected and is still in a conducting state, and a reverse recovery loss of the diode D2 anti-parallel connected to T2 is further eliminated, so that an overall loss of the controllable switch components is reduced and electromagnetic compatibility is improved.

A type of the controllable switch component is not limited in the embodiments. For example, the controllable switch component may also be a metal oxide semiconductor field effect transistor (MOSFET), a silicon carbide (SiC) MOSFET, or the like. The controller may send a pulse width modulation (PWM) signal to the controllable switch tube to control a working state of the controllable switch tube.

From the foregoing descriptions of the implementations, a person skilled in the art may clearly understand that some or all steps of the methods may be implemented by software in combination with a common hardware platform. Based on such an understanding, the embodiments may be reflected in a form of a software product. The computer software product may be stored in a non-transitory computer-readable storage medium in a form of a computer program, for example, a read-only memory (ROM)/RAM, a magnetic disk, or an optical disc, and includes several pieces of program code or instructions for enabling a computer device (which may be a personal computer, a server, or a network communication device such as a router) to perform the methods described in the embodiments.

It should be understood that "at least one (item)" refers to one or more, and "a plurality of" refers to two or more. The term "and/or" is used for describing an association relationship between associated objects, and indicates that three relationships may exist. For example, "A and/or B" may represent three cases: only A exists, only B exists, and both A and B exist, where A and B may be singular or plural. The character "/" may indicate an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, "a and b", "a and c", "b and c", or "a, b, and c", where a, b, and c may be singular or plural.

The embodiments are all described in a progressive manner. For same or similar parts in embodiments, reference may be made to each other, and each embodiment focuses on a difference from other embodiments.

Based on the above, the foregoing embodiments are merely used to describe but not to limit. Although described in detail with reference to the foregoing embodiments, a person of ordinary skill in the art may still modify the foregoing embodiments or perform equivalent replacement without departing from the scope of the embodiments.

What is claimed is:

1. A three-level inverter, comprising:
a plurality of controllable switch components comprising a first switch component, a second switch component, a third switch component, a fourth switch component, a fifth switch component, and a sixth switch component, wherein each of the controllable switch components comprises a parallel connected junction capacitor and an anti-parallel connected diode, a first terminal of the first switch component is connected to a positive direct current bus, a second terminal of the fourth switch component is connected to a negative direct current bus, a second terminal of the first switch component is connected to a first terminals of the second switch component and a first terminal of the fifth switch component, a first terminal of the fourth switch component is connected to a second terminals of the third switch component and a second terminal of the sixth switch component, a second terminal of the second switch component and a first terminal of the third switch component are connected to a direct current bus midpoint, and a second terminal of the fifth switch component and a first terminal of the sixth switch component are connected together to form a bridge arm terminal; and further comprising a controller, wherein the controller controls working states of the controllable switch components by sending control signals; and
the controller is configured to:
in a positive half cycle, control the third switch component to be conducted after the first switch component is conducted, and control the third switch component to be disconnected before the first switch component is conducted next time; and
in a negative half cycle, control the second switch component to be conducted after the fourth switch component is conducted, and control the second switch component to be disconnected before the fourth switch component is conducted next time.

2. The three-level inverter according to claim 1, wherein the controller is further configured to:

in the positive half cycle, adjust a duty cycle and/or a phase of a control signal of the second switch component, and control the third switch component by using an adjusted control signal; and in the negative half cycle, adjust a duty cycle and/or a phase of a control signal of the third switch component, and control the second switch component by using the adjusted control signal.

3. The three-level inverter according to claim 1, wherein in the positive half cycle, a duty cycle of a control signal of the third switch component increases or decreases relative to a duty cycle of a control signal of the second switch component; and in the negative half cycle, the duty cycle of the control signal of the second switch component increases or decreases relative to the duty cycle of the control signal of the third switch component.

4. The three-level inverter according to claim 1, wherein in the positive half cycle, the control signal of the third switch component is phase-shifted relative to the control signal of the second switch component; and in the negative half cycle, the control signal of the second switch component is phase-shifted relative to the control signal of the third switch component.

5. The three-level inverter according to claim 1, wherein the controller is further configured to:

in the positive half cycle, enable a rising edge of the control signal of the third switch component to delay relative to a rising edge of the control signal of the second switch component by a first preset time, and enable a falling edge of the control signal of the third switch component to advance relative to a falling edge of the control signal of the second switch component by a second preset time; and in the negative half cycle, enable the rising edge of the control signal of the second switch component to delay relative to the rising edge of the control signal of the third switch component by the first preset time, and enable the falling edge of the control signal of the second switch component to advance relative to the falling edge of the control signal of the third switch component by the second preset time.

6. The three-level inverter according to claim 1, wherein the controller is further configured to:

in the positive half cycle, enable a rising edge of the control signal of the third switch component to delay relative to a rising edge of the control signal of the second switch component by a third preset time; and enable a falling edge of the control signal of the third switch component to delay relative to a falling edge of the control signal of the second switch component by a fourth preset time, and advance relative to a next rising edge of a control signal of the first switch component by a fifth preset time, wherein the fifth preset time is used to ensure that the third switch component is already disconnected when the first switch component is conducted next time; and in the negative half cycle, enable the rising edge of the control signal of the second switch component to delay relative to the rising edge of the control signal of the third switch component by the third preset time; and enable the falling edge of the control signal of the second switch component to delay relative to the falling edge of the control signal of the third switch component by the fourth preset time, and advance relative to a next rising edge of the control signal of the fourth switch component by the fifth preset time, wherein the fifth preset time is used to ensure that the second switch component is already disconnected when the fourth switch component is conducted next time.

7. The three-level inverter according to claim 1, wherein the controller is further configured to:

in the positive half cycle, enable a rising edge of the control signal of the third switch component to delay relative to a rising edge of the control signal of the first switch component by a sixth preset time, and advance relative to a rising edge of the control signal of the second switch component by a seventh preset time, wherein the sixth preset time is used to ensure that the first switch component is already conducted when the third switch component is conducted; and enable a falling edge of the control signal of the third switch component to delay relative to a falling edge of the control signal of the second switch component by an eighth preset time, and advance relative to a next rising edge of the control signal of the first switch component by a ninth preset time, wherein the ninth preset time is used to ensure that the third switch component is already disconnected when the first switch component is conducted next time; and in the negative half cycle, enable the rising edge of the control signal of the second switch component to delay relative to a rising edge of a control signal of the fourth switch component by the sixth preset time, and advance relative to the rising edge of the control signal of the third switch component by the seventh preset time, wherein the sixth preset time is used to ensure that the fourth switch component is already conducted when the second switch component is conducted; and enable the falling edge of the control signal of the second switch component to delay relative to the falling edge of the control signal of the third switch component by the eighth preset time, and advance relative to a next rising edge of the control signal of the fourth switch component by the ninth preset time, wherein the ninth preset time is used to ensure that the second switch component is already disconnected when the fourth switch component is conducted next time.

8. The three-level inverter according to claim 1, wherein the controller is further configured to:

in the positive half cycle, enable a rising edge of the control signal of the third switch component to delay relative to a rising edge of a control signal of the first switch component by a tenth preset time, and advance relative to a falling edge of the control signal of the first switch component by an eleventh preset time, wherein the tenth preset time is used to ensure that the first switch component is already conducted when the third switch component is conducted; and enable a falling edge of the control signal of the third switch component to advance relative to a falling edge of the control signal of the second switch component by a twelfth preset time; and in the negative half cycle, enable a rising edge of the control signal of the second switch component to delay relative to a rising edge of a control signal of the fourth switch component by the tenth preset time, and advance relative to a falling edge of the control signal of the fourth switch component by the eleventh preset time, wherein the tenth preset time is used to ensure that the fourth switch component is already conducted when the second switch component is conducted; and enable the falling edge of the control signal of the second switch component to advance relative to the falling edge of the control signal of the third switch component by the twelfth preset time.

9. The three-level inverter according to claim 1, wherein the controller is further configured to:

in the positive half cycle, enable a rising edge of the control signal of the third switch component to delay relative to a rising edge of a control signal of the first switch component by a thirteenth preset time, and advance relative to a falling edge of the control signal of the first switch component by a fourteenth preset time, wherein the thirteenth preset time is used to ensure that the first switch component is already conducted when the third switch component is conducted; and enable a falling edge of the control signal of the third switch component to delay relative to a falling edge of the control signal of the second switch component by a fifteenth preset time, and advance relative to a next rising edge of the control signal of the first switch component by a sixteenth preset time, wherein the sixteenth preset time is used to ensure that the third switch component is already disconnected when the first switch component is conducted next time; and in the negative half cycle, enable a rising edge of the control signal of the second switch component to delay relative to a rising edge of a control signal of the fourth switch component by the thirteenth preset time, and advance relative to a falling edge of the control signal of the fourth switch component by the fourteenth preset time, wherein the thirteenth preset time is used to ensure that the fourth switch component is already conducted when the second switch component is conducted; and enable the falling edge of the control signal of the second switch component to delay relative to the falling edge of the control signal of the third switch component by the fifteenth preset time, and advance relative to a next rising edge of the control signal of the fourth switch component by the sixteenth preset time, wherein the sixteenth preset time is used to ensure that the second switch component is already disconnected when the fourth switch component is conducted next time.

10. A method for controlling a three-level inverter, wherein the three-level inverter comprises a plurality of controllable switch components comprising a first switch component, a second switch component, a third switch component, a fourth switch component, a fifth switch component, and a sixth switch component, wherein each of the controllable switch components comprises a parallel connected junction capacitor and an anti-parallel connected diode, a first terminal of the first switch component is connected to a positive direct current bus, a second terminal of the fourth switch component is connected to a negative direct current bus, a second terminal of the first switch component is connected to a first terminal of the second switch component and a first terminal of the fifth switch component, a first terminal of the fourth switch component is connected to a second terminals of the third switch component and a second terminal of the sixth switch component, a second terminal of the second switch component and a first terminal of the third switch component are connected to a direct current bus midpoint, and a second terminal of the fifth switch component and a first terminal of the sixth switch component are connected together to form a bridge arm terminal, and the method comprises:

in a positive half cycle, controlling the third switch component to be conducted after the first switch component is conducted, and controlling the third switch component to be disconnected before the first switch component is conducted next time; and in a negative half cycle, controlling the second switch component to be conducted after the fourth switch component is conducted, and controlling the second switch component to be disconnected before the fourth switch component is conducted next time.

11. The control method according to claim 10, further comprising:

in the positive half cycle, adjusting a duty cycle and/or a phase of a control signal of the second switch component, and controlling the third switch component by using the adjusted control signal; and in the negative half cycle, adjusting a duty cycle and/or a phase of a control signal of the third switch component, and controlling the second switch component by using the adjusted control signal.

12. The control method according to claim 10, wherein in the positive half cycle, a duty cycle of a control signal of the third switch component increases or decreases relative to a duty cycle of a control signal of the second switch component; and in the negative half cycle, the duty cycle of the control signal of the second switch component increases or decreases relative to the duty cycle of the control signal of the third switch component.

13. The control method according to claim 10, wherein in the positive half cycle, the control signal of the third switch component is phase-shifted relative to the control signal of the second switch component; and in the negative half cycle, the control signal of the second switch component is phase-shifted relative to the control signal of the third switch component.

14. The control method according to claim 10, wherein controlling the third switch component to be conducted after the first switch component is conducted, and controlling the third switch component to be disconnected before the first switch component is conducted next time, in the positive half cycle, further comprises:

enabling a rising edge of the control signal of the third switch component to delay relative to a rising edge of the control signal of the second switch component by a first preset time, and enabling a falling edge of the control signal of the third switch component to advance relative to a falling edge of the control signal of the second switch component by a second preset time; and controlling the second switch component to be conducted after the fourth switch component is conducted, and controlling the second switch component to be disconnected before the fourth switch component is conducted next time, in the negative half cycle, further comprises:

enabling the rising edge of the control signal of the second switch component to delay relative to the rising edge of the control signal of the third switch component by the first preset time, and enabling the falling edge of the control signal of the second switch component to advance relative to the falling edge of the control signal of the third switch component by the second preset time.

15. The control method according to claim 10, wherein controlling the third switch component to be conducted after the first switch component is conducted, and controlling the third switch component to be disconnected before the first switch component is conducted next time, in the positive half cycle, further comprises:

enabling a rising edge of the control signal of the third switch component to delay relative to a rising edge of the control signal of the second switch component by a third preset time; and enabling a falling edge of the control signal of the third switch component to delay relative to a falling edge of the control signal of the second switch component by a fourth preset time, and advance relative to a next rising edge of a control signal of the first switch component by a fifth preset time, wherein the fifth preset time is used to ensure that the third switch component is already disconnected when the first switch component is conducted next time; and controlling the second switch component to be conducted after the fourth switch component is conducted, and controlling the second switch component to be disconnected before the fourth switch component is conducted next time, in the negative half cycle, further comprises:

enabling the rising edge of the control signal of the second switch component to delay relative to the rising edge of the control signal of the third switch component by the third preset time; and enabling the falling edge of the control signal of the second switch component to delay relative to the falling edge of the control signal of the third switch component by the fourth preset time, and advance relative to a next rising edge of a control signal of the fourth switch component by the fifth preset time, wherein the fifth preset time is used to ensure that the second switch component is already disconnected when the fourth switch component is conducted next time.

16. The control method according to claim 10, wherein controlling the third switch component to be conducted after the first switch component is conducted, and controlling the third switch component to be disconnected before the first switch component is conducted next time, in the positive half cycle, further comprises:

enabling a rising edge of the control signal of the third switch component to delay relative to a rising edge of the control signal of the first switch component by a sixth preset time, and advance relative to a rising edge of the control signal of the second switch component by a seventh preset time, wherein the sixth preset time is used to ensure that the first switch component is already conducted when the third switch component is conducted; and enabling a falling edge of the control signal of the third switch component to delay relative to a falling edge of the control signal of the second switch component by an eighth preset time, and advance relative to a next rising edge of the control signal of the first switch component by a ninth preset time, wherein the ninth preset time is used to ensure that the third switch component is already disconnected when the first switch component is conducted next time; and controlling the second switch component to be conducted after the fourth switch component is conducted, and controlling the second switch component to be disconnected before the fourth switch component is conducted next time, in the negative half cycle, further comprises:

enabling the rising edge of the control signal of the second switch component to delay relative to a rising edge of a control signal of the fourth switch component by the sixth preset time, and advance relative to the rising edge of the control signal of the third switch component by the seventh preset time, wherein the sixth preset time is used to ensure that the fourth switch component is already conducted when the second switch component is conducted; and enabling the falling edge of the control signal of the second switch component to delay relative to the falling edge of the control signal of the third switch component by the eighth preset time, and advance relative to a next rising edge of the control signal of the fourth switch component by the ninth preset time, wherein the ninth preset time is used to ensure that the second switch component is already disconnected when the fourth switch component is conducted next time.

17. The control method according to claim 10, wherein controlling the third switch component to be conducted after the first switch component is conducted, and controlling the third switch component to be disconnected before the first switch component is conducted next time, in the positive half cycle, further comprises:

enabling a rising edge of the control signal of the third switch component to delay relative to a rising edge of a control signal of the first switch component by a tenth preset time, and advance relative to a falling edge of the control signal of the first switch component by an eleventh preset time, wherein the tenth preset time is used to ensure that the first switch component is already conducted when the third switch component is conducted; and enabling a falling edge of the control signal of the third switch component to advance relative to a falling edge of the control signal of the second switch component by a twelfth preset time; and controlling the second switch component to be conducted after the fourth switch component is conducted, and controlling the second switch component to be disconnected before the fourth switch component is conducted next time, in the negative half cycle, further comprises:

enabling a rising edge of the control signal of the second switch component to delay relative to a rising edge of a control signal of the fourth switch component by the tenth preset time, and advance relative to a falling edge of the control signal of the fourth switch component by the eleventh preset time, wherein the tenth preset time is used to ensure that the fourth switch component is already conducted when the second switch component is conducted; and enabling the falling edge of the control signal of the second switch component to advance relative to the falling edge of the control signal of the third switch component by the twelfth preset time.

18. The control method according to claim 10, wherein controlling the third switch component to be conducted after the first switch component is conducted, and controlling the third switch component to be disconnected before the first switch component is conducted next time, in the positive half cycle, further comprises:

enabling a rising edge of the control signal of the third switch component to delay relative to a rising edge of a control signal of the first switch component by a thirteenth preset time, and advance relative to a falling edge of the control signal of the first switch component by a fourteenth preset time, wherein the thirteenth preset time is used to ensure that the first switch component is already conducted when the third switch component is conducted; and enabling a falling edge of the control signal of the third switch component to delay relative to a falling edge of the control signal of the second switch component by a fifteenth preset time, and advance relative to a next rising edge of the control signal of the first switch component by a sixteenth preset time, wherein the sixteenth preset time is used to ensure that the third switch component is already disconnected when the first switch component is conducted next time; and controlling the second switch component to be conducted after the fourth switch component is conducted, and controlling the second switch component to be disconnected before the fourth switch component is conducted next time, in the negative half cycle, further comprises:

enabling a rising edge of the control signal of the second switch component to delay relative to a rising edge of a control signal of the fourth switch component by the thirteenth preset time, and advance relative to a falling edge of the control signal of the fourth switch component by the fourteenth preset time, wherein the thirteenth preset time is used to ensure that the fourth switch component is already conducted when the second switch component is conducted; and enabling the falling edge of the control signal of the second switch component to delay relative to the falling edge of the control signal of the third switch component by the fifteenth preset time, and advance relative to a next rising edge of the control signal of the fourth switch component by the sixteenth preset time, wherein the sixteenth preset time is used to ensure that the second switch component is already disconnected when the fourth switch component is conducted next time.

19. A photovoltaic power generation system, comprising a three-level inverter and a photovoltaic unit, wherein the photovoltaic unit comprises a plurality of photovoltaic modules, and an output terminal of the photovoltaic unit is connected to an input terminal of the three-level inverter; and the photovoltaic unit is configured to: convert light energy into a direct current and transmit the direct current to the three-level inverter comprising a plurality of controllable switch components comprising a first switch component, a second switch component, a third switch component, and a fourth switch component, wherein each of the controllable switch components comprises a parallel connected junction capacitor and an anti-parallel connected diode, a first terminal of the first switch component is connected to a positive direct current bus, a second terminal of the fourth switch component is connected to a negative direct current bus, a second terminal of the first switch component is connected to a first terminal of the second switch component, a first terminal of the fourth switch component is connected to second terminal of the third switch component, a second terminal of the second switch component and a first terminal of the third switch component are connected to a direct current bus midpoint; and further comprising a controller, wherein the controller controls working states of the controllable switch components by sending control signals; and the controller is configured to:

in a positive half cycle, control the third switch component to be conducted after the first switch component is conducted, and control the third switch component to be disconnected before the first switch component is conducted next time; and in a negative half cycle, control the second switch component to be conducted after the fourth switch component is conducted, and control the second switch component to be disconnected before the fourth switch component is conducted next time.

20. The photovoltaic power generation system according to claim 19, wherein the controller is further configured to:

in the positive half cycle, adjust a duty cycle and/or a phase of a control signal of the second switch component, and control the third switch component by using an adjusted control signal; and in the negative half cycle, adjust a duty cycle and/or a phase of a control signal of the third switch component, and control the second switch component by using the adjusted control signal.

* * * * *